US008137176B2

(12) United States Patent
Bernard et al.

(10) Patent No.: US 8,137,176 B2
(45) Date of Patent: Mar. 20, 2012

(54) CONFIGURABLE DISPLAYS USED, FOR EXAMPLE IN GAMING MACHINES

(75) Inventors: Vernon Bernard, Henderson, NV (US); Karl Wudtke, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 673 days.

(21) Appl. No.: 12/262,003

(22) Filed: Oct. 30, 2008

(65) Prior Publication Data

US 2010/0113125 A1 May 6, 2010

(51) Int. Cl.
*G06F 17/00* (2006.01)
*G06F 19/00* (2011.01)

(52) U.S. Cl. ............ 463/16; 463/20; 463/25; 273/143 R

(58) Field of Classification Search ........................ None
See application file for complete search history.

(56) References Cited

U.S. PATENT DOCUMENTS

| | | | | |
|---|---|---|---|---|
| 4,517,558 A | | 5/1985 | Davids | 340/700 |
| 4,517,654 A | | 5/1985 | Carmean | 364/521 |
| 4,621,814 A | | 11/1986 | Stepan et al. | 273/138 A |
| 4,635,937 A | | 1/1987 | Dickinson et al. | 273/143 R |
| 4,660,833 A | | 4/1987 | Dickinson et al. | 273/143 R |
| 4,693,477 A | | 9/1987 | Dickinson et al. | 273/143 R |
| 4,711,452 A | | 12/1987 | Dickinson et al. | 273/143 R |
| 4,926,996 A | | 5/1990 | Eglise et al. | 194/212 |
| 5,050,881 A | | 9/1991 | Nagao | 273/143 R |
| 5,058,893 A | | 10/1991 | Dickinson et al. | 273/143 R |
| 5,152,529 A | * | 10/1992 | Okada | 463/20 |
| 5,178,389 A | | 1/1993 | Bentley et al. | 273/138 A |
| 5,275,400 A | | 1/1994 | Weingardt et al. | 273/85 CP |
| 5,332,219 A | | 7/1994 | Marnell, II et al. | 273/138 A |
| 5,361,885 A | | 11/1994 | Modler | 194/214 |
| 5,389,945 A | | 2/1995 | Sheridon | 345/85 |
| 5,395,111 A | | 3/1995 | Inoue | 273/143 R |
| 5,462,277 A | | 10/1995 | Takemoto | 273/121 B |
| 5,511,784 A | | 4/1996 | Furry et al. | 273/143 R |
| 5,559,950 A | | 9/1996 | Cannon | 395/162 |
| 5,580,055 A | * | 12/1996 | Hagiwara | 273/143 R |
| 5,584,764 A | | 12/1996 | Inoue | 463/20 |
| 5,609,524 A | | 3/1997 | Inoue | 463/20 |

(Continued)

FOREIGN PATENT DOCUMENTS

| | | |
|---|---|---|
| JP | 2003-265682 | 9/2003 |

(Continued)

OTHER PUBLICATIONS

JP 200427553 A—Translation, translated on Jun. 2, 2011 using AIPN machine translation tool.*

(Continued)

*Primary Examiner* — Paul A. D'Agostino
(74) *Attorney, Agent, or Firm* — Seed IP Law Group PLLC

(57) ABSTRACT

Configurable rotatable displays may allow display of visual effects and/or information, and may simulate a non-configurable mechanical reel, for example those found in conventional slot machines. Rotatable displays may be used in a variety of locations on a gaming machine, providing a primary game display and/or box top displays such as a pole. A single rotatable display may be logically segmented to create an appearance of multiple sections or reels. One or more rotatable displays, or one or more mechanical reels, may be positioned within an outer rotatable display. A configurable fixed translucent or transparent display may be positioned between a configurable rotatable display and a user or player.

18 Claims, 11 Drawing Sheets

U.S. PATENT DOCUMENTS

| | | | | | |
|---|---|---|---|---|---|
| 5,630,753 | A | | 5/1997 | Fuchs | 463/9 |
| 5,636,843 | A | | 6/1997 | Roberts | 273/292 |
| 5,655,961 | A | | 8/1997 | Acres et al. | 463/27 |
| 5,702,302 | A | | 12/1997 | Gauselmann | 463/20 |
| 5,704,835 | A | | 1/1998 | Dietz, II | 463/20 |
| 5,722,891 | A | | 3/1998 | Inoue | 463/20 |
| 5,752,881 | A | * | 5/1998 | Inoue | 463/20 |
| 5,758,875 | A | | 6/1998 | Giacalone, Jr. | 273/143 R |
| 5,770,914 | A | | 6/1998 | Pease et al. | 310/339 |
| 5,775,692 | A | | 7/1998 | Watts et al. | 273/143 R |
| 5,788,573 | A | | 8/1998 | Baerlocher et al. | 463/16 |
| 5,796,389 | A | | 8/1998 | Bertram et al. | 345/173 |
| 5,830,068 | A | | 11/1998 | Brenner et al. | 463/42 |
| 5,833,536 | A | | 11/1998 | Davids et al. | 463/11 |
| 5,848,932 | A | | 12/1998 | Adams | 463/20 |
| 5,851,011 | A | | 12/1998 | Lott | 273/292 |
| 5,863,249 | A | | 1/1999 | Inoue | 463/20 |
| 5,882,261 | A | | 3/1999 | Adams | 463/20 |
| 5,934,676 | A | | 8/1999 | Rubin | 273/309 |
| 5,947,820 | A | | 9/1999 | Morro et al. | 463/9 |
| 5,951,397 | A | | 9/1999 | Dickinson | 463/36 |
| 5,967,894 | A | | 10/1999 | Kinoshita et al. | 463/13 |
| 5,984,782 | A | | 11/1999 | Inoue | 463/20 |
| 6,001,016 | A | | 12/1999 | Walker et al. | 463/42 |
| 6,003,867 | A | * | 12/1999 | Rodesch et al. | 273/143 R |
| 6,004,207 | A | | 12/1999 | Wilson, Jr. et al. | 463/20 |
| 6,004,208 | A | | 12/1999 | Takemoto et al. | 463/20 |
| 6,010,404 | A | | 1/2000 | Walker et al. | 463/21 |
| 6,027,115 | A | | 2/2000 | Griswold et al. | 273/143 R |
| 6,032,955 | A | | 3/2000 | Luciano et al. | 273/138.1 |
| 6,059,289 | A | | 5/2000 | Vancura | 273/143 R |
| 6,068,552 | A | | 5/2000 | Walker et al. | 463/21 |
| 6,068,553 | A | | 5/2000 | Parker | 463/27 |
| 6,086,066 | A | * | 7/2000 | Takeuchi et al. | 273/143 R |
| 6,089,978 | A | | 7/2000 | Adams | 463/20 |
| 6,089,980 | A | | 7/2000 | Gauselmann | 463/27 |
| 6,102,394 | A | | 8/2000 | Wurz et al. | 273/138.2 |
| 6,102,799 | A | | 8/2000 | Stupak | 463/27 |
| 6,105,962 | A | | 8/2000 | Malavazos et al. | 273/143 R |
| 6,110,041 | A | | 8/2000 | Walker et al. | 463/20 |
| 6,110,043 | A | | 8/2000 | Olsen | 463/27 |
| 6,113,098 | A | | 9/2000 | Adams | 273/143 R |
| 6,113,492 | A | | 9/2000 | Walker et al. | 463/16 |
| 6,117,009 | A | | 9/2000 | Yoseloff | 463/20 |
| 6,135,884 | A | | 10/2000 | Hedrick et al. | 463/20 |
| 6,146,273 | A | | 11/2000 | Olsen | 463/27 |
| 6,159,096 | A | | 12/2000 | Yoseloff | 463/20 |
| 6,162,121 | A | | 12/2000 | Morro et al. | 463/16 |
| 6,165,070 | A | | 12/2000 | Nolte et al. | 463/20 |
| 6,168,520 | B1 | | 1/2001 | Baerlocher et al. | 463/16 |
| 6,168,523 | B1 | | 1/2001 | Piechowiak et al. | 463/26 |
| 6,186,894 | B1 | | 2/2001 | Mayeroff | 463/20 |
| 6,201,532 | B1 | | 3/2001 | Tode et al. | 345/156 |
| 6,203,430 | B1 | | 3/2001 | Walker et al. | 463/20 |
| 6,206,780 | B1 | | 3/2001 | Awada | 463/13 |
| 6,210,279 | B1 | | 4/2001 | Dickinson | 463/37 |
| 6,213,875 | B1 | | 4/2001 | Suzuki | 463/20 |
| 6,213,877 | B1 | | 4/2001 | Walker et al. | 463/26 |
| 6,217,447 | B1 | | 4/2001 | Lofink et al. | 463/12 |
| 6,220,959 | B1 | | 4/2001 | Holmes, Jr. et al. | 463/13 |
| 6,224,483 | B1 | | 5/2001 | Mayeroff | 463/20 |
| 6,224,484 | B1 | | 5/2001 | Okuda et al. | 463/27 |
| 6,227,970 | B1 | | 5/2001 | Shimizu et al. | 463/20 |
| 6,227,971 | B1 | | 5/2001 | Weiss | 463/20 |
| 6,227,972 | B1 | | 5/2001 | Walker et al. | 463/25 |
| 6,234,898 | B1 | | 5/2001 | Belamant et al. | 463/25 |
| 6,244,958 | B1 | | 6/2001 | Acres | 463/26 |
| 6,293,864 | B1 | | 9/2001 | Romero | 463/12 |
| 6,302,790 | B1 | | 10/2001 | Brossard | 463/20 |
| 6,309,300 | B1 | | 10/2001 | Glavich | 463/26 |
| 6,311,976 | B1 | | 11/2001 | Yoseloff et al. | 273/138.2 |
| 6,315,666 | B1 | | 11/2001 | Mastera et al. | 463/31 |
| 6,318,721 | B1 | | 11/2001 | Randall et al. | 273/148 R |
| 6,319,124 | B1 | | 11/2001 | Baerlocher et al. | 463/20 |
| 6,322,078 | B1 | | 11/2001 | Adams | 273/292 |
| 6,328,649 | B1 | | 12/2001 | Randall et al. | 463/20 |
| 6,334,814 | B1 | | 1/2002 | Adams | 463/20 |
| 6,336,863 | B1 | | 1/2002 | Baerlocher et al. | 463/27 |
| 6,346,043 | B1 | | 2/2002 | Colin et al. | 463/17 |
| 6,350,199 | B1 | | 2/2002 | Williams et al. | 463/16 |
| 6,358,146 | B1 | | 3/2002 | Adams | 463/20 |
| 6,361,044 | B1 | | 3/2002 | Block et al. | 273/149 R |
| 6,364,767 | B1 | | 4/2002 | Brossard et al. | 463/20 |
| 6,368,216 | B1 | | 4/2002 | Hedrick et al. | 463/20 |
| 6,375,570 | B1 | | 4/2002 | Poole | 463/31 |
| 6,383,076 | B1 | | 5/2002 | Tiedeken | 463/40 |
| 6,386,974 | B1 | | 5/2002 | Adams | 463/16 |
| 6,394,900 | B1 | | 5/2002 | McGlone et al. | 463/20 |
| 6,394,902 | B1 | | 5/2002 | Glavich et al. | 463/20 |
| 6,398,220 | B1 | | 6/2002 | Inoue | 273/142 R |
| 6,406,369 | B1 | | 6/2002 | Baerlocher et al. | 463/20 |
| 6,413,162 | B1 | | 7/2002 | Baerlocher et al. | 463/20 |
| 6,454,649 | B1 | | 9/2002 | Mattice et al. | 463/17 |
| 6,461,241 | B1 | | 10/2002 | Webb et al. | 463/20 |
| 6,464,581 | B1 | | 10/2002 | Yoseloff et al. | 463/20 |
| 6,464,582 | B1 | | 10/2002 | Baerlocher et al. | 463/20 |
| 6,476,798 | B1 | | 11/2002 | Bertram et al. | 345/174 |
| 6,494,454 | B2 | | 12/2002 | Adams | 273/292 |
| 6,494,785 | B1 | | 12/2002 | Gerrard et al. | 463/20 |
| 6,511,375 | B1 | | 1/2003 | Kaminkow | 463/20 |
| 6,517,433 | B2 | * | 2/2003 | Loose et al. | 463/20 |
| 6,517,437 | B1 | | 2/2003 | Wells et al. | 463/30 |
| 6,520,856 | B1 | | 2/2003 | Walker et al. | 463/21 |
| 6,530,842 | B1 | | 3/2003 | Wells et al. | 463/46 |
| 6,554,703 | B1 | | 4/2003 | Bussick et al. | 463/20 |
| 6,558,254 | B2 | | 5/2003 | Baelocher et al. | 463/20 |
| 6,561,900 | B1 | | 5/2003 | Baerlocher et al. | 463/20 |
| 6,561,908 | B1 | | 5/2003 | Hoke | 463/35 |
| 6,565,433 | B1 | | 5/2003 | Baerlocher et al. | 463/20 |
| 6,565,436 | B1 | | 5/2003 | Baerlocher | 463/26 |
| 6,572,204 | B1 | | 6/2003 | Hedrick et al. | 312/223.1 |
| 6,575,541 | B1 | | 6/2003 | Hedrick et al. | 312/223.1 |
| 6,575,830 | B2 | | 6/2003 | Baerlocher et al. | 463/20 |
| 6,582,307 | B2 | | 6/2003 | Webb | 463/22 |
| 6,595,854 | B2 | | 7/2003 | Hughs-Baird et al. | 463/20 |
| 6,602,136 | B1 | | 8/2003 | Baerlocher et al. | 463/16 |
| 6,602,137 | B2 | | 8/2003 | Kaminkow et al. | 463/16 |
| 6,605,000 | B2 | | 8/2003 | Adams | 463/20 |
| 6,605,002 | B2 | | 8/2003 | Baerlocher | 463/25 |
| 6,620,047 | B1 | | 9/2003 | Alcorn et al. | 463/37 |
| 6,623,357 | B2 | | 9/2003 | Chowdhury | 463/25 |
| 6,628,939 | B2 | | 9/2003 | Paulsen | 455/414 |
| 6,629,591 | B1 | | 10/2003 | Griswold et al. | 194/205 |
| 6,632,139 | B1 | | 10/2003 | Baerlocher | 463/16 |
| 6,632,141 | B2 | | 10/2003 | Webb et al. | 463/25 |
| 6,634,943 | B1 | | 10/2003 | Baerlocher | 463/25 |
| 6,634,945 | B2 | | 10/2003 | Glavich et al. | 463/25 |
| 6,638,164 | B2 | | 10/2003 | Randall et al. | 463/20 |
| 6,645,078 | B1 | | 11/2003 | Mattice | 463/42 |
| 6,651,985 | B2 | | 11/2003 | Sines et al. | 273/309 |
| 6,652,378 | B2 | | 11/2003 | Cannon et al. | 463/20 |
| 6,656,040 | B1 | | 12/2003 | Brosnan et al. | 463/16 |
| 6,656,041 | B1 | | 12/2003 | Kaminkow et al. | 463/16 |
| 6,659,864 | B2 | | 12/2003 | McGahn et al. | 463/16 |
| 6,663,488 | B1 | | 12/2003 | Adams | 463/17 |
| 6,663,489 | B2 | | 12/2003 | Baerlocher | 463/20 |
| 6,672,960 | B1 | | 1/2004 | B-Jensen | 463/20 |
| 6,676,510 | B1 | | 1/2004 | Bittman et al. | 463/20 |
| 6,676,516 | B2 | | 1/2004 | Baerlocher et al. | 463/25 |
| 6,692,356 | B2 | | 2/2004 | Baerlocher et al. | 463/20 |
| 6,695,696 | B1 | | 2/2004 | Kaminkow | 463/16 |
| 6,695,699 | B2 | | 2/2004 | Beaulieu | 463/25 |
| 6,695,703 | B1 | | 2/2004 | McGahn | 463/46 |
| 6,702,409 | B2 | | 3/2004 | Hedrick et al. | 312/223.1 |
| 6,702,667 | B2 | | 3/2004 | Mattice et al. | 463/16 |
| 6,702,675 | B2 | | 3/2004 | Poole et al. | 463/31 |
| 6,709,332 | B2 | | 3/2004 | Adams | 463/20 |
| 6,712,693 | B1 | | 3/2004 | Hettinger | 463/20 |
| 6,712,694 | B1 | | 3/2004 | Nordman | 463/20 |
| 6,712,698 | B2 | | 3/2004 | Paulsen et al. | 463/30 |
| 6,722,974 | B2 | | 4/2004 | Sines et al. | 463/12 |
| 6,722,976 | B2 | | 4/2004 | Adams | 463/16 |
| 6,726,563 | B1 | | 4/2004 | Baerlocher et al. | 463/25 |
| 6,731,313 | B1 | | 5/2004 | Kaminkow | 345/839 |
| 6,733,389 | B2 | | 5/2004 | Webb et al. | 463/20 |
| 6,734,843 | B2 | | 5/2004 | Bertram et al. | 345/173 |
| 6,739,973 | B1 | | 5/2004 | Lucchesi et al. | 463/35 |

| | | | | |
|---|---|---|---|---|
| 6,743,102 | B1 | 6/2004 | Fiechter et al. | 463/42 |
| 6,746,328 | B2 | 6/2004 | Cannon et al. | 463/17 |
| 6,761,632 | B2 | 7/2004 | Bansemer et al. | 463/16 |
| 6,769,985 | B1 | 8/2004 | Laakso et al. | 463/25 |
| 6,887,157 | B2 | 5/2005 | LeMay et al. | 463/32 |
| 6,902,481 | B2 | 6/2005 | Breckner et al. | 463/30 |
| 6,960,134 | B2 | 11/2005 | Hartl et al. | 463/20 |
| 7,048,630 | B2 | 5/2006 | Berg et al. | 463/30 |
| 7,063,615 | B2 | 6/2006 | Alcorn et al. | 463/1 |
| 7,234,697 | B2 * | 6/2007 | Okada | 273/143 R |
| 7,264,241 | B2 | 9/2007 | Schubert et al. | 273/149 R |
| 7,278,917 | B2 | 10/2007 | McGlone et al. | 463/20 |
| 7,291,068 | B2 | 11/2007 | Bryant et al. | 463/25 |
| 7,303,475 | B2 | 12/2007 | Britt et al. | 463/42 |
| 7,309,065 | B2 | 12/2007 | Yoseloff et al. | 273/292 |
| 7,309,284 | B2 * | 12/2007 | Griswold et al. | 463/29 |
| 7,311,602 | B2 * | 12/2007 | Inoue | 463/20 |
| 7,331,859 | B2 | 2/2008 | Hornik et al. | 463/16 |
| 7,344,442 | B2 * | 3/2008 | Inoue | 463/20 |
| 7,367,885 | B2 | 5/2008 | Escalera et al. | 463/32 |
| 7,384,339 | B2 | 6/2008 | LeMay et al. | 463/30 |
| 7,399,226 | B2 | 7/2008 | Mishra | 463/18 |
| 7,427,233 | B2 | 9/2008 | Walker et al. | 463/16 |
| 7,434,805 | B2 | 10/2008 | Grauzer et al. | 273/149 R |
| 7,458,890 | B2 | 12/2008 | Loose et al. | 463/16 |
| 7,494,413 | B2 | 2/2009 | Singer et al. | 463/20 |
| 7,578,739 | B2 | 8/2009 | Gauselmann | 463/27 |
| 7,585,220 | B2 | 9/2009 | Loose et al. | 463/20 |
| 7,611,409 | B2 | 11/2009 | Muir et al. | 463/29 |
| 7,654,899 | B2 * | 2/2010 | Durham et al. | 463/30 |
| 7,684,874 | B2 | 3/2010 | Schlottmann et al. | 700/9 |
| 7,686,688 | B2 | 3/2010 | Friedman et al. | 463/25 |
| 7,699,703 | B2 | 4/2010 | Muir et al. | 463/29 |
| 7,744,462 | B2 | 6/2010 | Grav et al. | 463/27 |
| 7,753,773 | B2 * | 7/2010 | Baerlocher et al. | 463/20 |
| 7,753,790 | B2 | 7/2010 | Nguyen et al. | 463/42 |
| 7,780,525 | B2 | 8/2010 | Walker et al. | 463/29 |
| 7,850,520 | B2 * | 12/2010 | Yoshimi | 463/20 |
| 8,007,360 | B2 * | 8/2011 | Kishi | 463/20 |
| 2002/0163125 | A1 | 11/2002 | Grauzer et al. | 273/149 R |
| 2003/0036425 | A1 | 2/2003 | Kaminkow et al. | 463/25 |
| 2003/0075869 | A1 | 4/2003 | Breeding et al. | 273/292 |
| 2003/0130028 | A1 * | 7/2003 | Aida et al. | 463/20 |
| 2003/0195037 | A1 | 10/2003 | Vuong et al. | 463/29 |
| 2003/0224858 | A1 | 12/2003 | Yoseloff et al. | 463/43 |
| 2003/0232640 | A1 | 12/2003 | Walker et al. | 463/16 |
| 2004/0043815 | A1 | 3/2004 | Kaminkow | 463/25 |
| 2004/0102244 | A1 | 5/2004 | Kryuchkov et al. | 463/32 |
| 2004/0133485 | A1 | 7/2004 | Schoomaker et al. | 705/30 |
| 2004/0166927 | A1 * | 8/2004 | Okada | 463/20 |
| 2004/0227866 | A1 * | 11/2004 | Okada | 349/58 |
| 2004/0254012 | A1 | 12/2004 | D'Amico et al. | 463/26 |
| 2005/0043094 | A1 | 2/2005 | Nguyen et al. | 463/42 |
| 2005/0054438 | A1 | 3/2005 | Rothschild et al. | 463/29 |
| 2005/0070358 | A1 | 3/2005 | Angell et al. | 463/39 |
| 2005/0098951 | A1 | 5/2005 | Groves | 273/292 |
| 2005/0124411 | A1 | 6/2005 | Schneider et al. | 463/29 |
| 2005/0215311 | A1 | 9/2005 | Hornik et al. | 463/20 |
| 2005/0239542 | A1 | 10/2005 | Olsen | 463/27 |
| 2005/0282626 | A1 | 12/2005 | Manfredi et al. | 463/25 |
| 2006/0009282 | A1 | 1/2006 | George et al. | 463/29 |
| 2006/0019745 | A1 | 1/2006 | Benbrahim | 463/29 |
| 2006/0046849 | A1 | 3/2006 | Kovacs | 463/39 |
| 2006/0058100 | A1 | 3/2006 | Pacey et al. | 463/31 |
| 2006/0079317 | A1 | 4/2006 | Flemming et al. | 463/25 |
| 2006/0089192 | A1 * | 4/2006 | Okada | 463/20 |
| 2006/0148557 | A1 * | 7/2006 | Okada | 463/25 |
| 2006/0281529 | A1 | 12/2006 | Seelig et al. | 463/20 |
| 2007/0060365 | A1 | 3/2007 | Tien et al. | 463/42 |
| 2007/0077986 | A1 * | 4/2007 | Loose et al. | 463/20 |
| 2007/0077990 | A1 | 4/2007 | Cuddy et al. | 463/25 |
| 2007/0082737 | A1 | 4/2007 | Morrow et al. | 463/42 |
| 2007/0111775 | A1 | 5/2007 | Yoseloff | 463/16 |
| 2007/0117608 | A1 | 5/2007 | Roper et al. | 463/16 |
| 2007/0167235 | A1 | 7/2007 | Naicker | 463/42 |
| 2007/0235521 | A1 | 10/2007 | Mateen et al. | 235/379 |
| 2007/0243925 | A1 | 10/2007 | LeMay et al. | 463/20 |
| 2007/0259711 | A1 | 11/2007 | Thomas | 463/22 |
| 2007/0287535 | A1 | 12/2007 | Soltys | 463/29 |
| 2007/0298868 | A1 | 12/2007 | Soltys | 463/25 |
| 2008/0090651 | A1 | 4/2008 | Baerlocher | 463/27 |
| 2008/0113764 | A1 | 5/2008 | Soltys | 463/22 |
| 2008/0113781 | A1 | 5/2008 | Soltys et al. | 463/28 |
| 2008/0214277 | A1 * | 9/2008 | Kishi | 463/20 |
| 2008/0261674 | A9 * | 10/2008 | Okada | 463/16 |
| 2009/0005176 | A1 | 1/2009 | Morrow et al. | 463/43 |
| 2009/0115133 | A1 | 5/2009 | Kelly et al. | 273/274 |
| 2009/0117994 | A1 | 5/2009 | Kelly et al. | 463/25 |
| 2009/0118001 | A1 | 5/2009 | Kelly et al. | 463/29 |
| 2009/0118005 | A1 | 5/2009 | Kelly et al. | 463/31 |
| 2009/0275395 | A1 | 11/2009 | McAllister et al. | 463/25 |
| 2009/0275398 | A1 | 11/2009 | Nelson | 463/27 |
| 2009/0275402 | A1 | 11/2009 | Backover et al. | 463/29 |
| 2010/0113125 | A1 | 5/2010 | Bernard et al. | 463/20 |

FOREIGN PATENT DOCUMENTS

| | | | |
|---|---|---|---|
| JP | 2004275536 | A * | 10/2004 |
| WO | 03/023751 | A1 | 3/2003 |

OTHER PUBLICATIONS

Bally Technologies, "Introducing the New Bally Alpha Elite™ S9C," 12 pages.

Bally Technologies, Inc., iVIEW, http://ballytech.com/systems/product.cfm?id=9, download date Nov. 6, 2007, 2 pages.

Captain Morgan's Casino, Inc., "Blazing Sevens," accessed Oct. 31, 2006, URL = http://www.captainmorganscasino.com/casino-games/blazing-seven, 1 page.

MagTek, "Port Powered Swipe Reader," Technical Reference Manual, Manual Part No. 99875094 Rev 12, Jun. 2003, 20 pages.

Mikohn, "Mikohn Tablelink—The Industry's Premier Table Tracking Solution Delivers Improvements Straight to the Bottom Line," 2 pages, before Jan. 1, 2004.

Mikohn, "Tablelink™, The New Standard in Table Games," before Jan. 1, 2004, 14 pages.

VideoSlotMachines.com, "Bally Gaming: Blazing Sevens," accessed Jan. 5, 2007, URL = http://www.videoslotmachines.com/bally/blazingsevens.htm, 1 page.

International Search Report for PCT/US2009/061360, mailed on May 24, 2010, 2 pages.

* cited by examiner

CONFIGURABLE DISPLAYS USED, FOR EXAMPLE IN GAMING MACHINES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field

This disclosure generally relates to gaming machines, and particularly to configurable displays that may be employed in devices, for example gaming machines and other entertainment devices.

2. Description of the Related Art

Gaming machines employ various types of displays for displaying information to users, such as players. Traditional displays may include a number (e.g., three or more) mechanical reels, which each carry various indicia or symbols (e.g., bar, cherry, plum, BLAZING 7®.). Such mechanical reels are traditional associated with mechanical slot machines. In such machines, awards may be won when a particular pattern of symbols occur along a given line (e.g., one or more vertical rows, one or more horizontal columns, or one or more diagonals). Other common displays include light emitting diodes (LEDs). Such may be used individually or in one- or two-dimensional arrays to produce provide information or entertainment. Another common display is the cathode ray tube (CRT), typically associated with television monitors. Such have been integrated into various gaming machines, such as video poker or video BLACKJACK. More recently, liquid crystal displays (LCDs) have been substituted for CRTs, for example in video slot machines, video poker and/or video BLACKJACK. LCDs are relatively compact, typically having a small thickness as compared to CRTs. Some LCDs are capable of receiving user input, via touch or a stylus. Such LCDs are commonly denominated as touch screen displays.

These displays may be used to provide information about a game, may present the game itself, or may serve as an interface for the player to access a variety of functions. Displays as interfaces are important to a game's success. Hence improvements in display technology are desirable For example, close emulation of existing gaming machines may increase acceptance by players. For instance, a close visual emulation of a mechanical slot machine may increase acceptance of video slot machines by players. The ability to create new, aesthetically pleasing effects is also desirable.

BRIEF SUMMARY OF THE EMBODIMENTS OF THE INVENTION

An apparatus may be summarized as including at least a first support structure mounted to rotate about a first axis of rotation; a first set of display structures including at least two display structures each including a plurality of addressable elements, each of the at least two displays structures of the first set of display structures being elongated with a respective longitudinal axis, each of the at least two displays structures of the first set of display structures physically coupled to the first support structure to rotate therewith about the first axis; a drive mechanism coupled to drivingly rotate the first support structure about the first axis of rotation along with the at least two display structures mounted thereto at a speed sufficiently fast that individual ones of the at least two display structures are not visually discernable during operation of the apparatus; and a controller communicatively coupled to control the addressable elements of the at least two display structures of the first set to selectively emit light from the at least two display structures of the first set. The at least two display structures of the first set of displays structures may be physically coupled to the first support structure with the respective longitudinal axes of the display structures of the second set of display structures parallel to the first axis and with each of the at least two displays structures of the first set of display structures angularly spaced about the first axis of rotation with respect to each other to form a first configurable reel therewith.

The apparatus may further include a concealment structure located within a perimeter defined by a rotation of the at least two one display structures (wherein the concealment structure is the black or mirrored, wherein the concealment structure is fixed).

The apparatus may further include at least a second support structure mounted to rotate about the first axis of rotation and spaced along the first axis of rotation from the first support structure; and a second set of display structures including at least two display structures each including a plurality of addressable elements, each of the at least two displays structures of the second set of display structures being elongated with a respective longitudinal axis, each of the at least two displays structures of the second set of display structures physically coupled to the second support structure to rotate therewith about the first axis, wherein the controller is communicatively coupled to control the addressable elements of the at least two display structures of the second set of display structures to selectively emit light from the at least two display structures of the second set of display structures. The at least two display structures of the first set of displays structures may be physically coupled to the first support structure with the respective longitudinal axes of the display structures of the second set of display structures parallel to the first axis and with each of the at least two displays structures of the first set of display structures angularly spaced about the first axis of rotation with respect to each other to form a first configurable reel therewith and wherein the at least two display structures of the second set of displays structures are physically coupled to the second support structure with the respective longitudinal axes of the display structures of the second set of display structures parallel to the first axis and with each of the at least two displays structures of the second set of display structures angularly spaced about the first axis of rotation with respect to each other to form a second configurable reel therewith.

The apparatus may further include a plurality of additional support structures mounted to rotate about the first axis of rotation and spaced along the first axis of rotation from the first support structure and from one another; a plurality of additional sets of display structures each including at least two display structures each of which include a plurality of addressable elements, wherein each of the additional support structures has at least one of the additional sets of display structures physically coupled thereto to rotate therewith about the first axis of rotation as a respective additional configurable reel, wherein a total number of support structures including the first support structure and all of the additional support structures is an odd number.

The apparatus may further include at least a second support structure mounted to rotate about a second axis of rotation, the second support structure received within a perimeter defined by a rotation of the at least two display structures of the first set of display structures; and a second set of display structures including at least two display structures each including a plurality of addressable elements, each of the at least two displays structures of the second set of display structures being elongated with a respective longitudinal axis, each of the at least two displays structures of the second set of display structures physically coupled to the second support structure to rotate therewith about the second axis, wherein the controller is communicatively coupled to control the addressable elements of the at least two display structures of the second set of display structures to selectively emit light from the at least two display structures of the second set of display structures. The second axis of rotation may be co-linear with the first axis of rotation and the second set of display structures are concentrically received within a perimeter defined by the rotation of the first set of display structures.

The apparatus may further include a second set of display structures including at least two display structures each including a plurality of addressable elements, each of the at least two displays structures of the second set of display structures being elongated with a respective longitudinal axis, each of the at least two displays structures of the second set of display structures physically coupled to the second support structure inwardly from the display structures of the first set of display structures to rotate therewith about the first axis, wherein the controller is communicatively coupled to control the addressable elements of the at least two display structures of the second set of display structures to selectively emit light from the at least two display structures of the second set of display structures.

The apparatus may further include a plurality of mechanical reels each bearing a number of fixed indicia, the mechanical reels mounted to rotate about a second axis of rotation, the mechanical reels received within a perimeter defined by a rotation of first set of display structures. The second axis of rotation may be co-linear with the first axis of rotation. The at least one display structure mounted to the first support structure may include at least two display structures, each of the at least two displays structures being elongated with a respective longitudinal axis that is perpendicular to the first axis of rotation, and each of the at least two display structures mounted spaced about the first axis of rotation with respect to each other.

The apparatus may further include a display that is positioned relatively behind the at least one display structure and that is visible from relatively in front of the at least one display structure as the at least one displays structure rotates.

The apparatus may further include a mechanical wheel that is positioned relatively behind the at least one display structure and that is visible from relatively in front of the at least one display structure as the at least one displays structure rotates.

The apparatus may further include a housing having an interior in which the first support structure is received and at least one window that provides visual access from an exterior of the housing to a portion of the interior; and a light transmissive display structure positioned between the at least one display structure and the window through which the light transmissive display structure and the at least one display structure is viewable by a user of the apparatus, wherein the light transmissive display structure passes at least some visually discernable amount of light emitted by the at least one display structure. The light transmissive display structure may be stationary with respect to the housing of the apparatus.

The apparatus may further include a housing having an interior in which the first support structure is received and at least one window that provides visual access from an exterior of the housing to a portion of the interior; and a light transparent curved display structure positioned between the at least one display structure and the window through which the light transparent curved display structure and the at least one display structure is viewable by a user of the apparatus, wherein the light transparent curved display structure passes at least some visually discernable amount of light emitted by the at least one display structure.

The apparatus may further include a housing, a top box carried above the housing, wherein the first support structure and the first set of display structures are located in the top box. The addressable elements of the first display structure may be a number of light emitting diodes. The controller may be configured control the addressable elements of the at least two display structures of the first set of displays structures such that addressable elements at a same relative pixel on the at least two display structures emit light at a same relative angular position along a path of rotation followed by the at least two displays structures.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF SEVERAL EMBODIMENTS OF THE INVENTION

Figure 1:
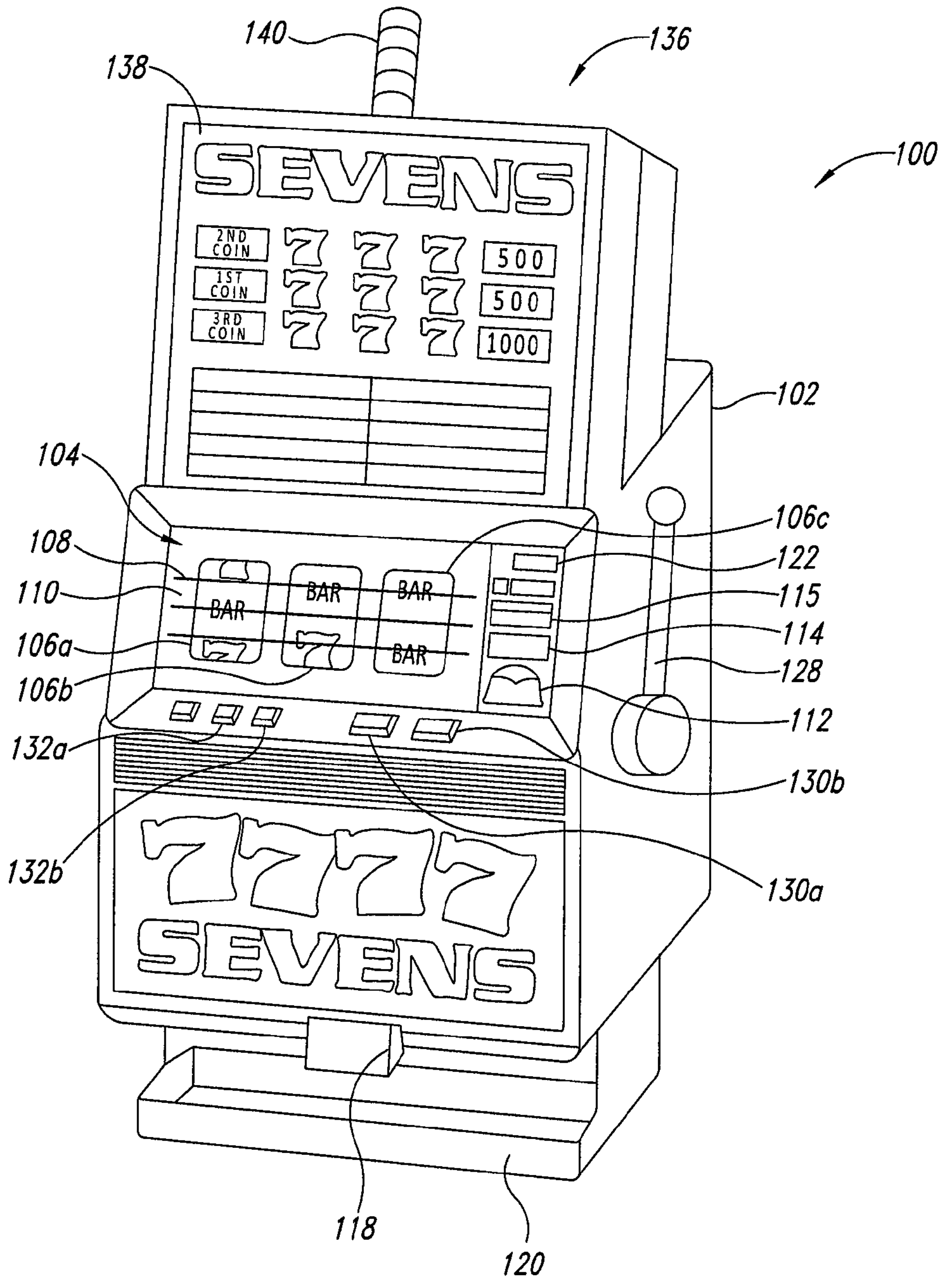
FIG. 1 is an isometric view of a gaming machine, according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with gaming machines, electronic gaming machines, controllers, microprocessors, computer-readable storage media, communications ports, and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

FIG. 1A shows a gaming device in the form of a slot type gaming machine 100, according to one illustrated embodiment.

The gaming machine 100 has main housing or cabinet 102 which may include a main window 104. The main window 104 may include one or more displays associated with a primary game played on the gaming machine 100. For example, the displays may take the form of one or more reels 106*a*-106*c* (collectively 106). The window 104 may also include one or more line markings 108 (only one called out in FIG. 1), delineating possible wins rows, columns and/or diagonals. As discussed in detail below, the reels 106 may take the form of standard non-configurable reels bearing fixed indicia and/or configurable reels that dynamically display dynamic or changeable indicia. A bezel 110 may block the view in an interior of the main housing or cabinet 102 or the gaming machine 100, other than the reels 108.

The gaming machine 100 may include a coin or token in slot 112, sized to receive one or more coins or tokens. The coin or token in slot 112 may be sized to receive a specific denomination of coin or token, or may be sized to receive a variety of denominations of coins or token. The gaming machine 100 may include commercially available devices to authenticate coins or tokens received via the coin or token in slot 112. The gaming machine 100 may have a currency or voucher in slot 114 to receive one or more pieces or currency or vouchers. The currency or voucher in slot 114 may be sized to receive a specific denomination of paper currency or voucher or may be sized to receive a variety of pieces of currency and/or vouchers. The gaming machine 100 may include suitable commercially available devices to authenticate the currency and/or vouchers. The gaming machine 100 additionally or alternatively include one or more card slots 116 sized to receive a card type media. The card type media may, for example, take the form of a payment card (e.g., credit card, debit card, gift card, prepaid card). The card type media may additionally or alternatively, take the form a loyalty or player club card that allows a player to receive credits or reward for play. The card type media may additionally or alternatively, take the form of some form of identification (e.g. driver's license), which may allow the age of a prospective player to be automatically assessed. The gaming machine 100 may include commercially available devices (e.g., magnetic stripe reader, radio frequency identification interrogator or reader) to read information encoded in the payment card, and may include commercially available mechanisms for verifying the read information (e.g., modem or networking card).

The gaming machine 100 may include a coin or token out slot or chute 118 and tray 120, sized to receive one or more coins dispensed from the gaming machine, for example in response to an occurrence of a win or winning event at the gaming machine 100. The gaming machine 100 may include a bank (not illustrated) in which coins are stored for use in small to intermediate sized payouts. Large payouts may be handled via a voucher which may be printed the gaming machine 100 or which may be issued by casino personnel.

The gaming machine 100 may include one or more auxiliary displays configured to provide auxiliary game related information. For example, a meter display 122 may display a number of game play credits accumulated on the gaming machine.

The gaming machine 100 may include one or more user input devices. For example, the gaming machine may include a handle 128, such as handles commonly associated with slot machines. Additionally, or alternatively the gaming machine may include one or more play buttons or keys 130*a*, 130*b*, selection of which causes a game to be played, for example the reels to rotate. For instance, selection of one button or key 130*a* may cause the game to be played with a default configuration (e.g., one credit) while selection of another button or key 130*b* may cause the game to be played with a most recent current configuration (e.g., last game played with two or more coins or credits). The gaming machine 100 may include one or more buttons or keys 132*a*, 132*b* to select the number of coins or credits to be played. For example, selection of one button or key 132*a* may select one coin or credit, while selection of another button or key 132*b* may toggle through different levels of coins or credits (e.g., successive selections cycling through one credit, two credits, three credits, before returning to one credit).

The gaming machine may include a top box 136. The top box 136 may include a static or dynamic promotional or informational display. For example, the top box 136 may include a static display of a pay table 138. The top box 136 may also include a pole (commonly referred to as a totem pole) 140. The pole 140 may be configured to provide a configurable visual display, for example in response to an occurrence of certain events (e.g., a win or a jackpot or bonus win). Such advantageously draws the attention of other patrons to the gaming machine encouraging further gaming, and may draw the attention of casino personnel who can verify the win.

Figure 2:
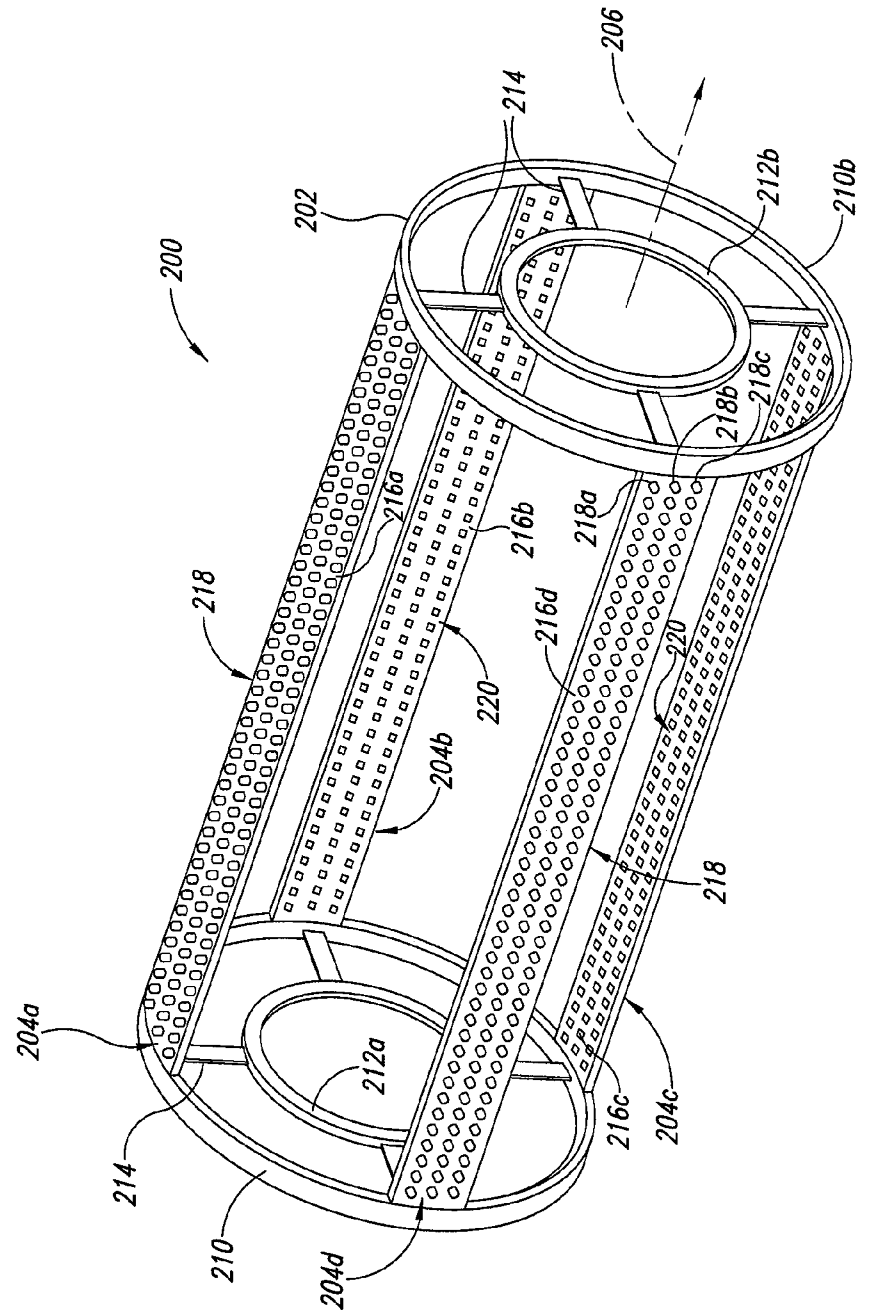
FIG. 2 is an isometric view of a configurable rotatable display including a support structure and a plurality of display structures coupled for rotation therewith to form a single physical reel, according to another illustrated embodiment.

FIG. 2 shows a configurable rotatable display 200, according to one illustrated embodiment. The configurable rotatable display 200 may be used in the gaming machine 100 (FIG. 1), for example to implement part or all of the main display 104, part or all of the top box 136 (for instance in the area of the pay table 138 to display the pay table 138 or other indicia in that location or as the pole 140), or to implement one or more of the auxiliary displays 122 elsewhere on the gaming machine 100.

The configurable rotatable display 200 includes a support structure 202 and a number of display structures 204*a*-204*d* (collectively 204) coupled to the support structure 202 for rotation therewith about an axis of rotation 206 such that the support structure 202 and displays structures 204 form a single physical reel.

The support structure 202 may take a variety of forms. As illustrated, the support structure 202 includes two end structures 208*a*, 208*b*, each formed by an outer ring 210*a*, 210*b* and an inner ring 212*a*, 212*b* and a number of spokes 214 radial extending therebetween.

The display structures 204 each include a substrate 216*a*-216*d* (collectively 216) physically coupled between the end structures 208*a*, 208*b*. The substrates 216 of the display structures 204 each carry a plurality of light sources 218 that are selectively operable or controllable to emit light. The light sources 218 may, for example be capable of emitting light at a number of different wavelengths, for instance red, green and blue. The light sources 218 may, for example, be arranged in rows on the respective substrates. For instance, each substrate 216 may carry a first row 218*a* of light sources that emit red light, a second row 218*b* of light sources that emit green light and a third row 218*c* of light sources that emit blue light. The display structures 204 may include one or more switches and electrically conductive paths (not shown) formed on one or more surfaces or in one or more layers of the substrates 216. For instance, the display substrates 216 may include transistors (e.g., thin film transistors) 220 coupled to selectively control respective ones of the light sources 218. As such, each of the transistors 220 is an addressable element which may be selectively addressed by suitable control means, and thus each of the light sources 218 is also an addressable element. Hence, the configurable rotatable display 202 is configurable in the sense that the output may be selectively changed or configured, for example to present certain indicia, information or other visual effects. In some embodiments, the light sources 218 can only be driven ON/OFF, while in other embodiments an intensity and/or wavelength of a given light source 218 may be controlled, for example by application of selected levels of current and/of voltage.

The substrates 216 may take the form of circuit boards, for example printed circuit boards formed of multiple electrically insulating layers (e.g., FR4, polyimide or KAPTON®), with one or more conductive layers or traces carried thereon or therein, and with one or more light sources 218 and transistors 220 coupled thereto. Such a substrate 216 may advantageously include structural such as a metal plate or web or a web of a composite material or honeycomb material to provide structural rigidity between the end structures 208*a*, 208*b*. Such may be electrically insulated from the light sources 218 and/or transistors 220 by one or more electrically insulating layers of material. Such may provide a suitable light weight yet strong structure that is capable of standing the repeated repetitions of rotational acceleration that the reel will be subjected to during use. The light sources 218 may take a variety of forms. For example, the light sources 218 may take the form of light emitting diodes (i.e., LEDs), with or without suitable coatings to produce the desired wavelengths of light. Other light sources may be employed.

Figure 3:
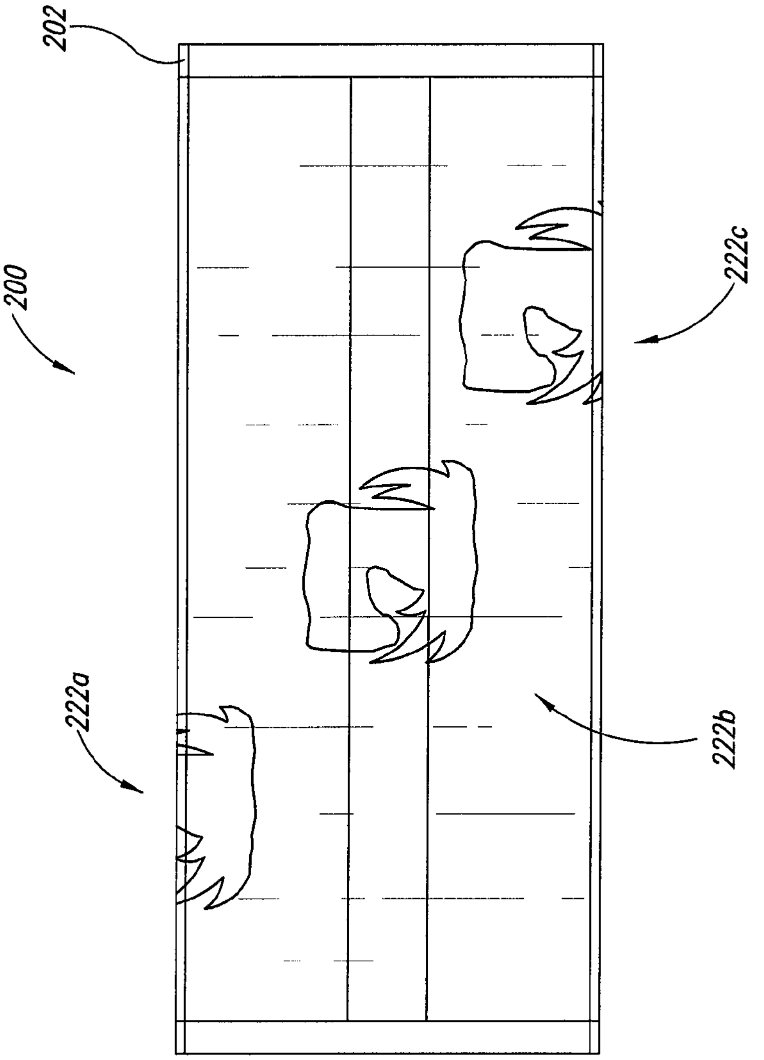
FIG. 3 is an isometric view of the configurable rotatable display of FIG. 2 shown while rotating and displaying indicia to form three virtual reels, according to one illustrated embodiment.

FIG. 3 shows the configurable rotatable display 200 while in motion, according to one illustrated embodiment.

The light sources 218 of the configurable rotatable display 200 are operated to produce three virtual reels, each displaying a set of respective indicia (only one called out in Figure) 222*a*-222*c* (collectively 222). In particular, light sources 218 of a finite number of different colors may be operated to produce a much greater number of colors, for example light sources 218 of three different colors may be operated to produce a total of approximately 16 million different colors. The rotation of the display structures 204 about the axis of rotation 206 (FIG. 2) is sufficiently fast that the individual displays structures 204 are not visually discernable by a user or player. Such replicates the visual appearance of three mechanical reels of a conventional slot machine.

For example, different color light sources (e.g., red, blue, green) in a single column may be turned on to achieve a desired color at a desired Y pixel location (e.g., column position or horizontal position in FIG. 3). As a display structure 204 rotates, the display structure 204 successively occupies different X pixel locations (e.g., vertical positions in FIG. 3). The light sources 218 may be operated (e.g., turned ON/OFF, various currents or voltages applied) based on the orientation or position of the respective display structure 204. For example, light sources 218 on a given display structure 204 may be turned ON when that display structure 204 is reaches a certain location or area or, equivalently, is at a certain angular position in its rotation about the rotational axis 206. Other light sources 218 may be turned ON as the given display structure 204 reaches a different location, area or angular position to produce a desired visual effect (e.g., symbol, text, design, appearance). Such may be used to form a two-dimensional image from an essentially linear display structure 204.

Additionally, the light sources 218 may be operated such that light sources 218 that are in a same respective position on each of two or more of the display structures 204 are turned ON to emit light to produce a desired visual effect (e.g., symbol, text, design, appearance). Such may be particularly advantageous where the rotational speed or angular velocity of the rotatable display 200 is relatively high. Thus, a subset of the light sources 218 at a first subset of positions on a first one of the display structure 204*a* may be turned ON when the first display structure 204*a* is at one or more locations proximate the main window 104, then turned OFF when the first display structure is no longer proximate the main window 104. A subset of the light sources 218 at a second subset of positions on a second of the display structures 204*b* may be turned ON when the second display structure 204*b* is at one or more locations proximate the main window 104, then turned OFF when the second display structure is no longer proximate the main window 104. The second subset of positions may be identical or similar to the first subset of positions, just on different display structures 204. Thus, if a red light source at every other Y pixel location of a first display structure 204*a* is ON at a first angular orientation or position, the red light sources at every other Y pixel location of a second, third and/or fourth display structure 204*b*-204*d*, respectively, is ON when each of those display structures 204*b*-204*d* reaches the same angular rotation or position, The timing of turning selected ones of the light sources 218 is synchronized with the rotation of the rotatable display structure 200. Such may rely on drive signals to one or more motors and/or based on feedback signals indicative of a position, speed and/or acceleration of the rotatable display structure 200.

Figure 4:
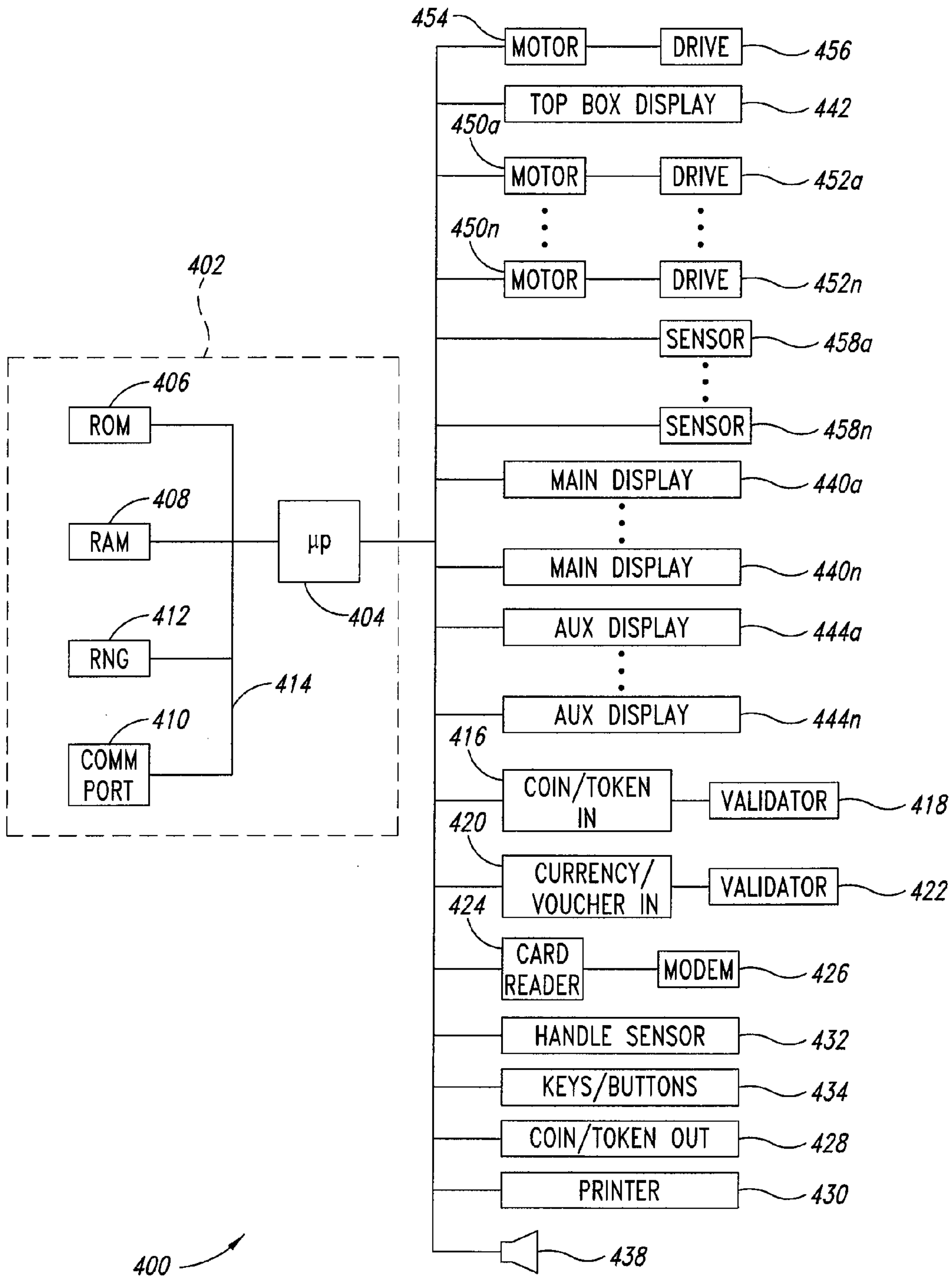
FIG. 4 is a block diagram showing a various elements of a gaming machine, according to one illustrated embodiment.

FIG. 4 shows a gaming machine system 400, according to one illustrated embodiment.

The gaming machine system 400 may include a controller 402 that controls operation of the gaming machine 100 (FIG. 1). The controller 402 is configured to receive input from and control various components of the gaming machine system 400. The controller 402 will at times be referred to in the singular herein, but this is not intended to limit the embodiments to a single system, since in certain embodiments, there will be more than one system or other networked computing device involved.

The controller 402 may include one or more processors 404. For example, the processor 404 may take the form of any logical processing unit such as a central processing unit (CPU), microprocessor, microcontroller, application specific integrated circuit (ASIC), programmable gate array (PGA), field programmable gate array (FPGA), digital signal processor (DSP), etc. Non-limiting examples of commercially available processors include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The controller 402 may include one or more processor readable memories, for example read only memory (i.e., ROM) 406 and/or random access memory (i.e., RAM) 408. The processor 404 may execute instructions stored in ROM 406 and/or RAM 408 to control operation the gaming machine 100 (FIG. 1). For example, the processor 404 may execute a basic input/output system ("BIOS"), which may be stored in the ROM 406, and which contains basic routines that help transfer information between elements within the controller 402, such as during start-up. For example, the processor 404 may execute one or more gaming machine applications, which may be stored in ROM 406 and/or RAM 408, and which contains the higher level routines that control operation of the various components of the gaming machine system 400.

The controller 402 may also include one or more communications ports 410 to provide communications outside of the gaming machine 100 (FIG. 1), for example communications to a server, for instance a configuration and management server, an accounting server such as a slot accounting management server, or to other gaming machines. The communications port 410 may additionally or alternatively provide communications to other control boards in the gaming machine 100 (Figure). The communications port 410 may employ any variety of forms of communications including wired and wireless communications. Such may include communications via various wires, cables, networks, routers, servers, infrared transmitters and/or receivers, RF or microwave transmitters or receivers, and other communication structures. Some communications paths may be specialized or dedicated communications paths between respective pairs or other groups of controllers or servers to provide efficient communications therebetween. In some embodiments, these communications paths may provide redundancy, for example providing communications when another communications path fails or is slow due to congestion.

The controller 402 may also include one or more dedicated random number generators (i.e., RNG) 412. The RNG 412 is configured to produce random or pseudo-random numbers, that are sufficiently random to compliance with any applicable gaming laws or regulations. Such may be employed to determine game outcomes, for example being employed to determine which game indicia 222 to display. The processor 404 may be coupled to the ROM 406, RAM 408, communications port 410 and/or RNG 412 by one or more buses, for example one or more communications buses, data buses, instructions buses, power buses, etc.

The controller 402 may take the form of a conventional PC programmed to execute the various operations described herein. Unless described otherwise, the construction and operation of the various blocks shown in FIG. 4 are of conventional design. As a result, such blocks need not be described in further detail herein, as they will be understood by those skilled in the relevant art.

While not illustrated, the controller 402 may also includes a hard disk drive for reading from and writing to a hard disk, and an optical disk drive and a magnetic disk drive for reading from and writing to removable optical disks and magnetic disks, respectively. The optical disk can be a CD or a DVD, while the magnetic disk can be a magnetic floppy disk or diskette. The hard disk drive, optical disk drive and magnetic disk drive communicate with the processor 404 via the system bus 414. The hard disk drive, optical disk drive and magnetic disk drive may include interfaces or controllers (not shown) coupled between such drives and the system bus 414, as is known by those skilled in the relevant art. The drives, and their associated computer-readable media, provide nonvolatile storage of computer-readable instructions, data structures, program modules and other data for the controller 402. Although the controller 402 is described as employing hard disk, optical disk and/or magnetic disk, those skilled in the relevant art will appreciate that other types of computer-readable media that can store data accessible by a computer may be employed, such as magnetic cassettes, flash memory cards, Bernoulli cartridges, RAMs, ROMs, smart cards, etc.

Program modules can be stored in one or more computer- or processor-readable storage media (e.g., ROM 406 or Ram 408), such as an operating system, one or more application programs, other programs or modules, drivers and program data. The applications program(s) may include the logic to operate the gaming machine system 400. For example, one or more application programs may execute a game, update various displays, receive and respond to various input or sensor information, drive various motors, monitor coin or token in, monitor currency or voucher in, monitor financial card transactions, update one or more meter(s), operate the coin/token out, and/or operate a printer.

Communications programs can be stored in one or more computer- or processor-readable storage media (e.g., ROM 406 or Ram 408). For example, a server and/or a Web client or browser may be stored, permitting the controller 402 to access and exchange data with other systems such as other gaming machine systems, Web sites on the Internet, corporate intranets, or other networks and servers as described below.

The communications programs in may be markup language based, such as Hypertext Markup Language (HTML), Extensible Markup Language (XML) or Wireless Markup Language (WML), and may operate with markup languages that use syntactically delimited characters added to the data of a document to represent the structure of the document. A number of servers and/or Web clients or browsers are commercially available such as those from Mozilla Corporation of California and Microsoft of Washington.

While described as, for example, being stored in the ROM 406 or RAM 408, the operating system, application programs, other programs/modules, drivers, program data, server and/or browser can be stored on the hard disk of the hard disk drive, the optical disk of the optical disk drive and/or the magnetic disk of the magnetic disk drive.

A user may be able to enter commands and information into the controller 402 through input devices such as a touch screen or keyboard and/or a pointing device such as a mouse. Other input devices can include a microphone, joystick, game pad, tablet, scanner, biometric scanning device, etc. These and other input devices are connected to the processor 404 through one or more interfaces such as a universal serial bus ("USB") interface that couples to the system bus 414, although other interfaces such as a parallel port, a game port or a wireless interface or a serial port may be used. One or more monitors or other display devices may be coupled to the system bus 414 via one or more video interfaces, such as a video adapters.

The controller 402 may operate in a networked environment using one or more of the logical connections to communicate with one or more remote computers, servers and/or devices via one or more communications channels, for example, one or more networks. These logical connections may facilitate any known method of permitting computers to communicate, such as through one or more LANs and/or WANs, such as the Internet. Such networking environments are well known in wired and wireless enterprise-wide computer networks, intranets, extranets, and the Internet. Other embodiments include other types of communication networks including telecommunications networks, cellular networks, paging networks, and other mobile networks.

When used in a WAN networking environment, the controller 402 may include a modem for establishing communications over the WAN, for instance the Internet. The modem may be communicatively linked between an interface and the Internet. Additionally or alternatively, another device, such as a network port 410, that is communicatively linked to the system bus 414, may be used for establishing communications over the Internet, intranet or extranet such as a secure intranet. Further, one or more network interfaces, that are communicatively linked to the system bus 414, may be used for establishing communications over a LAN or wireless LAN (WLAN). In a networked environment, program modules, application programs, or data, or portions thereof, can be stored in a server computing system (not shown). Those skilled in the relevant art will recognize that various network connections described herein are only some examples of ways of establishing communications between computers, and other connections may be used, including wirelessly.

The gaming machine system 400 may include a coin or token in mechanism 416 to register the receipt of a coin or token via the coin in slot 112 (FIG. 1) and provide suitable credit for such. The coin or token in mechanism 416 may be coupled to a validator 418 that determines whether the coin or token is valid, for example based on size, weight, electrical conductivity or inductance, etc. The coin or token in mechanism 416 only provides credit for coins or tokens that are deemed valid, and may return coins or tokens that cannot be validated.

The gaming machine system 400 may include a currency or voucher in mechanism 420 to register the receipt of a piece of currency or voucher via the currency or voucher in slot 114 (FIG. 1) and provide suitable credit for such. The currency or voucher in mechanism 420 may be coupled to a validator 422 that determines whether the currency or voucher is valid, for example based on size, weight, electrical conductivity or inductance, etc. The currency or voucher in mechanism 420 only provides credit for currency or voucher that are deemed valid, and may return currency or voucher that cannot be validated.

The gaming machine system 400 may include a card reader 424 to register the receipt of a card type media via the card slot 116 (FIG. 1) and provide suitable credit for such. The card reader 424 mechanism may, for example, include a magnetic stripe reader and/or an RFID interrogator or reader. The card reader 424 may be coupled to a modem 426 or communications port 410 to transmit read information to an authorizing entity, such as a card issuing authority (e.g., credit card issuing company, bank, etc.). The card reader 424 only provides credit for cards that are deemed valid, and may return cards that cannot be validated or retain cars that have been reported stolen or expired.

The gaming machine system 400 may include a coin or token out mechanism 428 to selectively dispense coins or tokens from a bank via the coin or token out slot or chute 118 (FIG. 1), for example in response to an occurrence of an event such as a win.

The gaming machine system 400 may include a printer 430. The printer may be configured to print vouchers, for example in response to a signal from a user at the end of play. The printer 430 may take a variety of forms, for example, an inkjet printer, a thermal printer, a bubble jet printer, xerographic or photostatic printer, etc., and may be capable of printing in black and white, grayscale or color. A variety of suitable print heads and print engines are commercially available.

The gaming machine system 400 may include a variety of devices to receive user input from a user or player. For example, the gaming machine system 400 may include a sensor 432 to detect the pull of a handle 128 (FIG. 1). As previously noted, the gaming machine system 400 may include one or more buttons or keys 434, for example the button or keys 130, 132 shown in FIG. 1, other keys or buttons, user selectable icons on a touch sensitive display, etc.

The gaming machine system 400 may include a variety of devices to provide user output to a user or player. For example, the gaming system 400 may include one or more speakers 438 operable to produce aural effects such as music, spoken language and other sounds. The gaming system 400 may include one or more visual displays. For instance, the gaming system 400 may include one or more main displays 440*a*-440*n* (collectively 440). The main displays 440 may take the form of one or more configurable displays, for instance the configurable rotatable displays formed as reels and described herein as capable of producing a dynamically configurable display of information or other visual effects. Also for instance, the gaming system 400 may include one or more top box displays 442. The top box displays 442 may take the form of one or more configurable displays, for instance the configurable rotatable displays formed as reels and described herein as capable of producing a dynamically configurable display of information or other visual effects. Such may be positioned in the pole 140 (FIG. 1) and/or in the location occupied by the pay table 138 (FIG. 1) of the top box 136 (FIG. 1). Also for instance, the gaming system 400 may include one or more auxiliary displays 444*a*-444*n* (collectively 444). The auxiliary displays 444 may take the form of one or more configurable displays, for instance one or more LED or liquid crystal displays (i.e., LCDs). Alternatively or additionally, one or more auxiliary displays 444 may employ a configurable display for instance the configurable rotatable displays formed as reels and described herein as capable of producing a dynamically configurable display of information or other visual effects.

In addition to the displays, the gaming system 400 may include one or more drive subsystems to drive the configurable displays that are configured as rotatable reels. For example, main drive subsystems may include one or more motors 450*a*-450*n* (collectively 450) and a drive mechanisms 452*a*-452*n* (collectively 425) that couples the motor 450 to a support structure 202 (FIG. 2) of the configurable main displays 440 to rotate the configurable main displays 440 about the axis of rotation 206. Also for example, top box drive subsystem may include one or more motors 454 and a drive mechanism 456 that couples the motor 454 to a support structure 202 (FIG. 2) of the configurable top box display 442 to rotate the configurable top box displays 442 about the axis of rotation 206. The drive mechanisms 452, 456 may take a variety of forms including, but not limited to, a linkage, gears, belt, pulley, transmission, clutch, etc. The gaming system 400 may include one or more feedback sensors 458*a*-458*n* to sense information about the position, speed, and/or acceleration of rotation of the configurable rotatable displays 440, 442. For example the sensors may sense the position, speed and/or acceleration of the support structures 202, display substrates 204, motors 450, 454, drive mechanisms 452, 456. Sensors may take any of a large variety of forms, for example one or more rotational encoders, Reed switch, etc. While not illustrated, the controller 402 may employ one or more dedicated motor controllers to interface between the processor 404 and the motors 450, 454.

Figure 5:
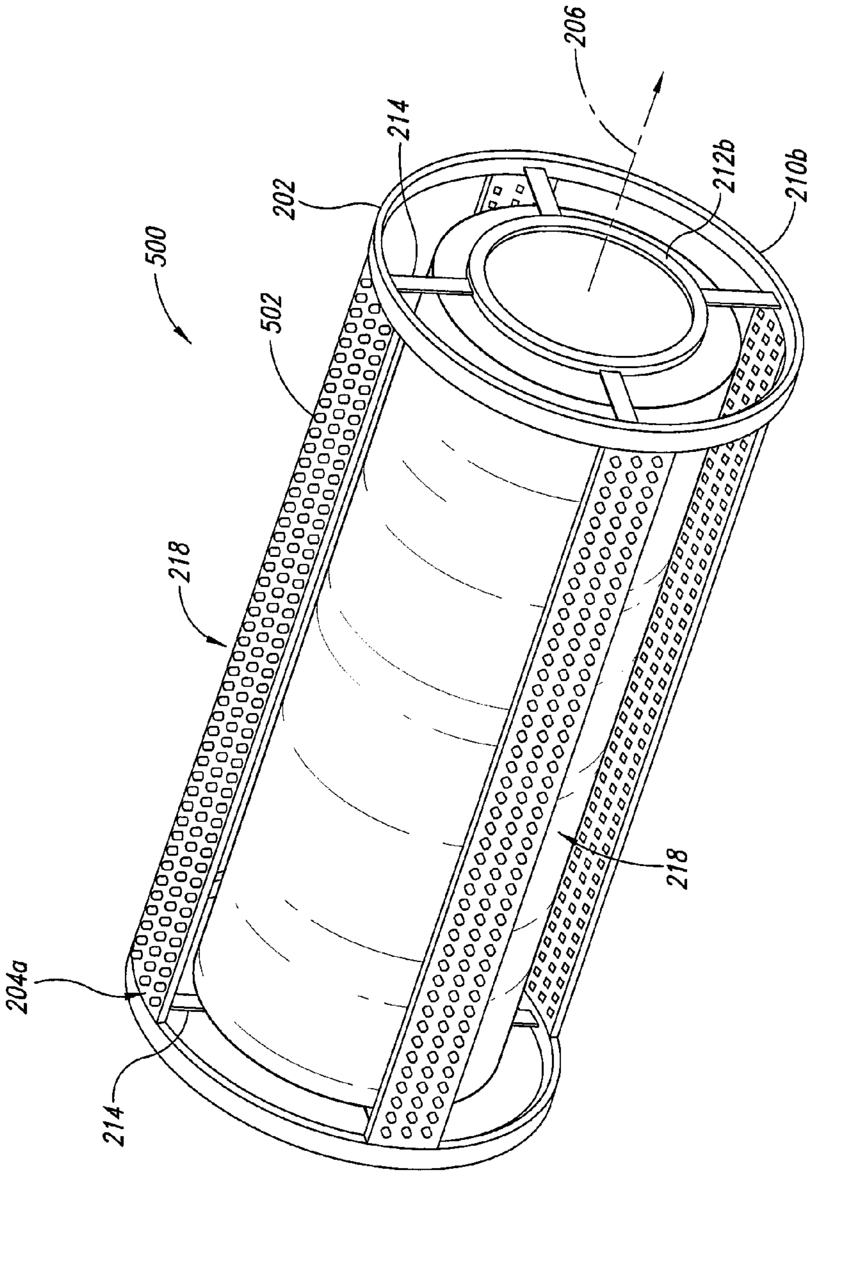
FIG. 5 is an isometric view of a configurable rotatable display including a support structure, a plurality of display structures coupled for rotation therewith to form a single physical reel, and a concealment member received therein, according to another illustrated embodiment.

FIG. 5 shows a configurable rotatable display 500, according to another illustrated embodiment.

In this embodiment, and the other embodiments that follow, structures that are Identical or similar to the previously described embodiment(s) are referred to using the same reference numbers. Only significant differences are described in detail below.

The configurable rotatable display 500 again take the form of a single physical reel but also includes a concealment member 502 received within an outer perimeter defined by either the support structure 202 or the rotation of the display structures 204. The concealment member 502 conceals the inner portion of the configurable rotatable display 500 and/or interior of the housing or cabinet 102 (FIG. 1) from the view of a user or player. This is particularly useful to conceal the interior at time when configurable rotatable display 500 is not in motion, but also provide concealment when the configurable rotatable display 500 is in motion. The concealment member 502 may be fixed relative to the housing or cabinet 102 (FIG. 1) of the gaming machine 100. The concealment member 502 may for example be black or some other dark color. Alternatively, the concealment member 502 may be mirrored. While illustrated as a cylindrical tubular structure, the concealment member 502 can take other forms, for example a flat shield or plate, particular if the concealment member 502 is fixed and does not rotate with the configurable rotatable display 500.

Figure 6:
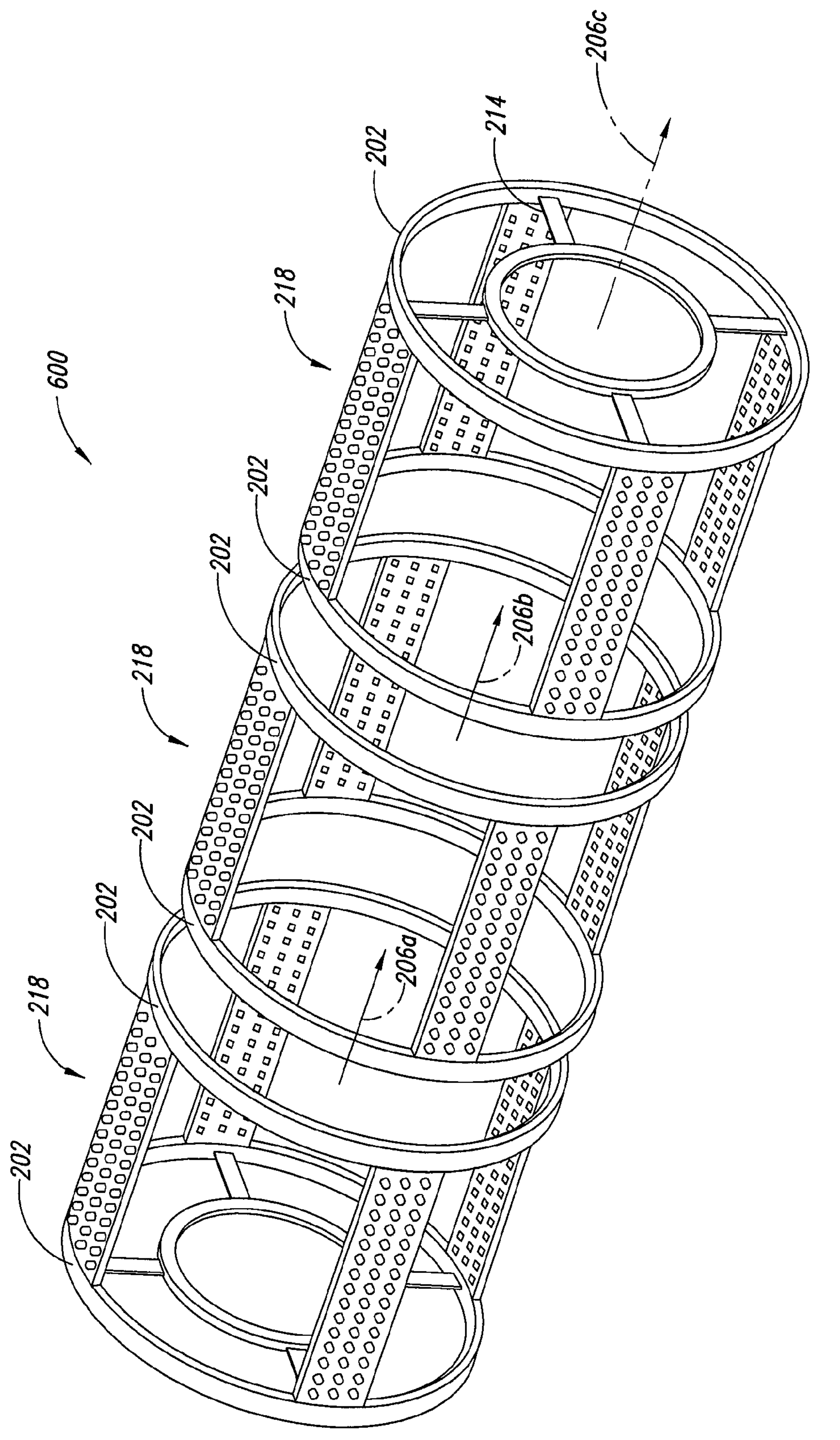
FIG. 6 is an isometric view of a configurable rotatable display including three support structures and a plurality of display structures, the display structures coupled to each of the support structures for rotation therewith to form a three distinct physical reels, according to another illustrated embodiment.

FIG. 6 shows a plurality of configurable rotatable displays 600*a*-600*c* (collectively 600), according to another illustrated embodiment.

The rotatable displays 600*a*-600*c* each form a distinct physical reel. The rotatable displays 600*a*-600*c* are coupled to rotate about respective axes of rotation 206*a*-206*c*, which in the illustrated embodiment are collinear. Each of the rotatable displays 600*a*-600*c* may be rotatably driven separately from one another, for example by separate motors 450, 454 (FIG. 4), or separate drive mechanisms 452, 456 (FIG. 4). Thus, it is possible to drive the rotatable displays 600*a*-600*c* at separate speeds or at different times from one another. While not illustrated in FIG. 6, the configurable rotatable displays 600*a*-600*c* may include one or more concealment members 502 (FIG. 5).

Figure 7:
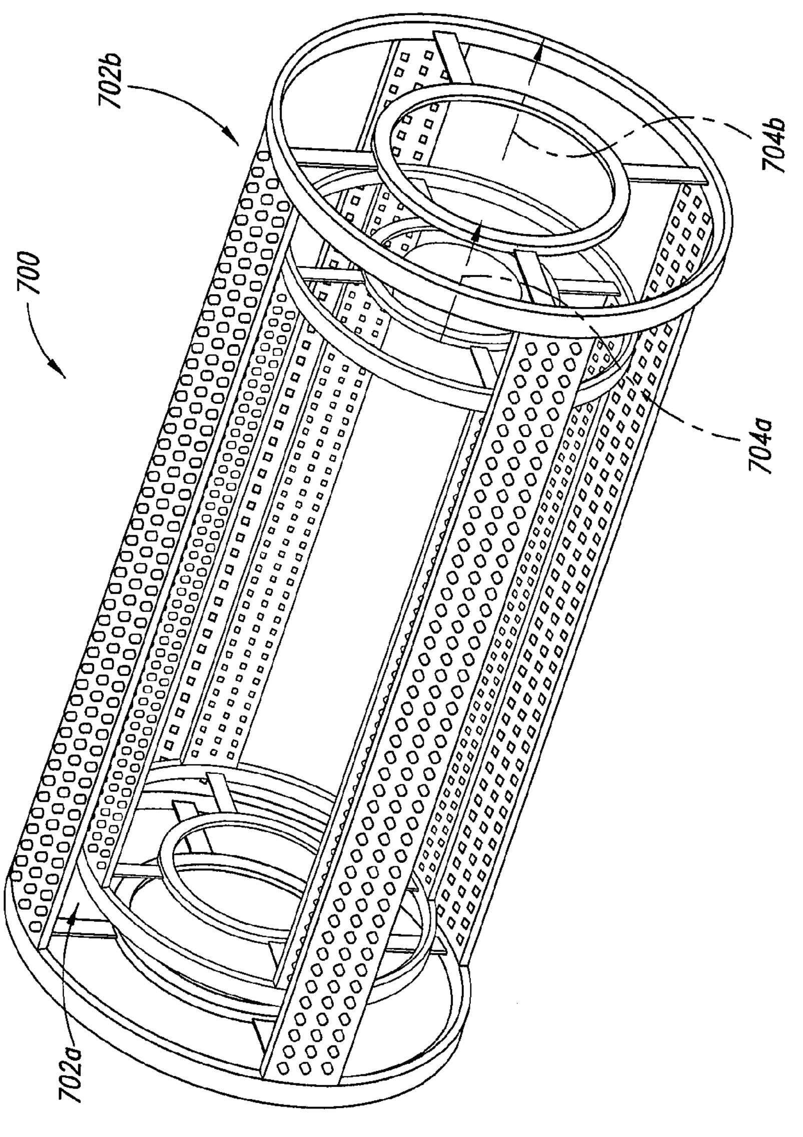
FIG. 7 is an isometric view of a configurable rotatable display in the form of an outer support structure and a plurality of display structures coupled thereto for rotation therewith to form a first outer physical reel and an inner support structure and a plurality of display structures coupled thereto for rotation therewith to form an inner physical reel received within the outer reel, according to another illustrated embodiment.

FIG. 7 shows a configurable rotatable display structure 700, according to another illustrated embodiment.

The configurable rotatable display structure 700 includes an inner configurable rotatable display 702*a* received in an outer rotatable display 702*b*. The inner and outer rotatable displays 702*a*, 702*b* are substantially identical or similar to the configurable rotatable display 200 except for the size of the diameter(s). The inner and outer rotatable displays 702*a*, 702*b* rotate about respective axes 704*a*, 704*b*. The inner configurable rotatable display 702*a* may be concentrically received by the outer configurable rotatable display 702*b*, and hence the axes of rotation 704*a*, 704*b* may be collinear. Each of the rotatable display 702*a*, 702*b* may be rotatably driven separately from one another, for example by separate motors 450, 454 (FIG. 4), or separate drive mechanisms 452, 456 (FIG. 4). Thus, it is possible to drive the rotatable display 702*a*, 702*b* at separate speeds or at different times from one another. While not illustrated in FIG. 7, the configurable rotatable displays 600*a*-600*c* may include one or more concealment members 502 (FIG. 5).

Figure 8:
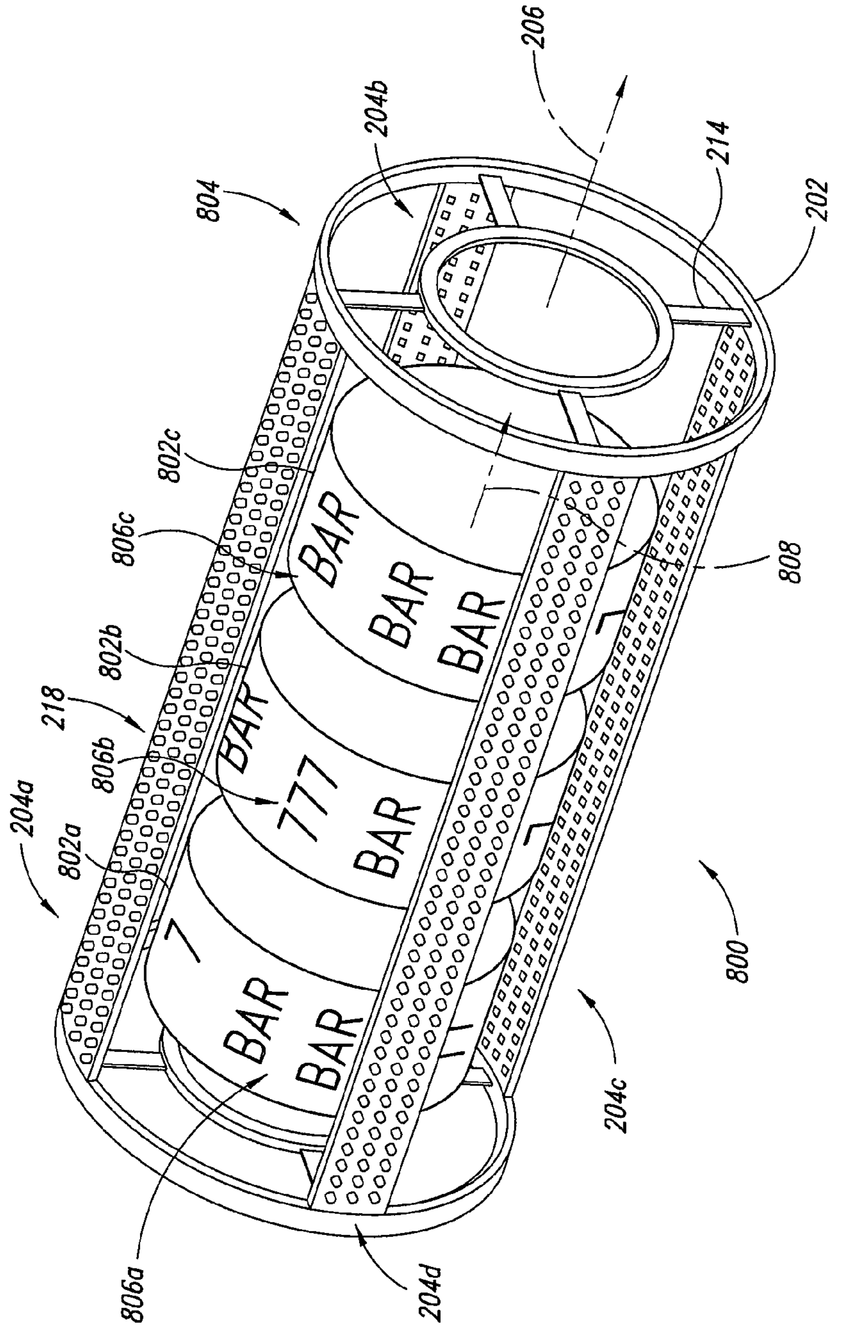
FIG. 8 is an isometric view of a display including an outer configurable rotatable display form as a outer physical reel, and three inner non-configurable rotatable reels received within the outer reel, according to another illustrated embodiment.

FIG. 8 shows a display structure 800, according to another illustrated embodiment.

The display structure 800 includes a number of inner non-configurable rotatable displays 802*a*-802*c* (collectively 802) received in an outer configurable rotatable display 804.

The inner non-configurable rotatable displays 802 takes the form of one or more mechanical reels, each bearing a plurality of fixed indicia 806*a*-806*c* (collectively 806, only one per mechanical reel called out in FIG. 8), hence is denominated as non-configurable. Such mechanical reels are commonly found in conventional slot machines. The inner non-configurable rotatable displays 802 may be rotated about an axis of rotation 808. For example, the inner non-configurable rotatable displays 802 may be driven about the axis of rotation 808 by a motor or by any other convention reel drive mechanism typically found in slot machines.

The outer rotatable display 804 is substantially identical or similar to the configurable rotatable display 200, except possibly for the size of the diameter, hence the same reference numbers are used to identify specific elements thereof. The outer rotatable display 804 includes a support structure 202 and a number of display structures 204 coupled thereto for rotation therewith about an axis of rotation 206. Each of the display structures 204 carries a plurality of light sources 208, which may be selectively operated to emit light and thereby configure and output of the display structures 204.

The axis of rotation 206 of the outer configurable rotatable display 804 and the axis of rotation 808 of the inner non-configurable rotatable displays 802 may be collinear, as illustrated in FIG. 8. Hence, the inner non-configurable rotatable displays 802 may be concentrically received by the outer configurable rotatable display 804. Alternatively, the axes of rotation 808, 206 may be parallel and offset from one another. The fixed indicia 806 of the inner non-configurable rotatable display 802 are visible through the rotating outer configurable rotatable display 804 when the outer configurable rotatable display 804 is rotated at a sufficiently high speed.

Each of the inner non-configurable rotatable displays 802 and the outer configurable rotatable display 804 may be rotatably driven together, for example via a shared motor 450, 454 (FIG. 4) or shared drive mechanism 452, 456 (FIG. 4). Alternatively, the inner non-configurable rotatable displays 802 and the outer configurable rotatable display 804 may be rotatably driven separately from one another, for example by separate motors 450, 454 (FIG. 4), or separate drive mechanisms 452, 456 (FIG. 4). Thus, it is possible to drive the inner non-configurable rotatable displays 802 and the outer configurable rotatable display 804 at separate speeds or at different times from one another.

Figure 9:
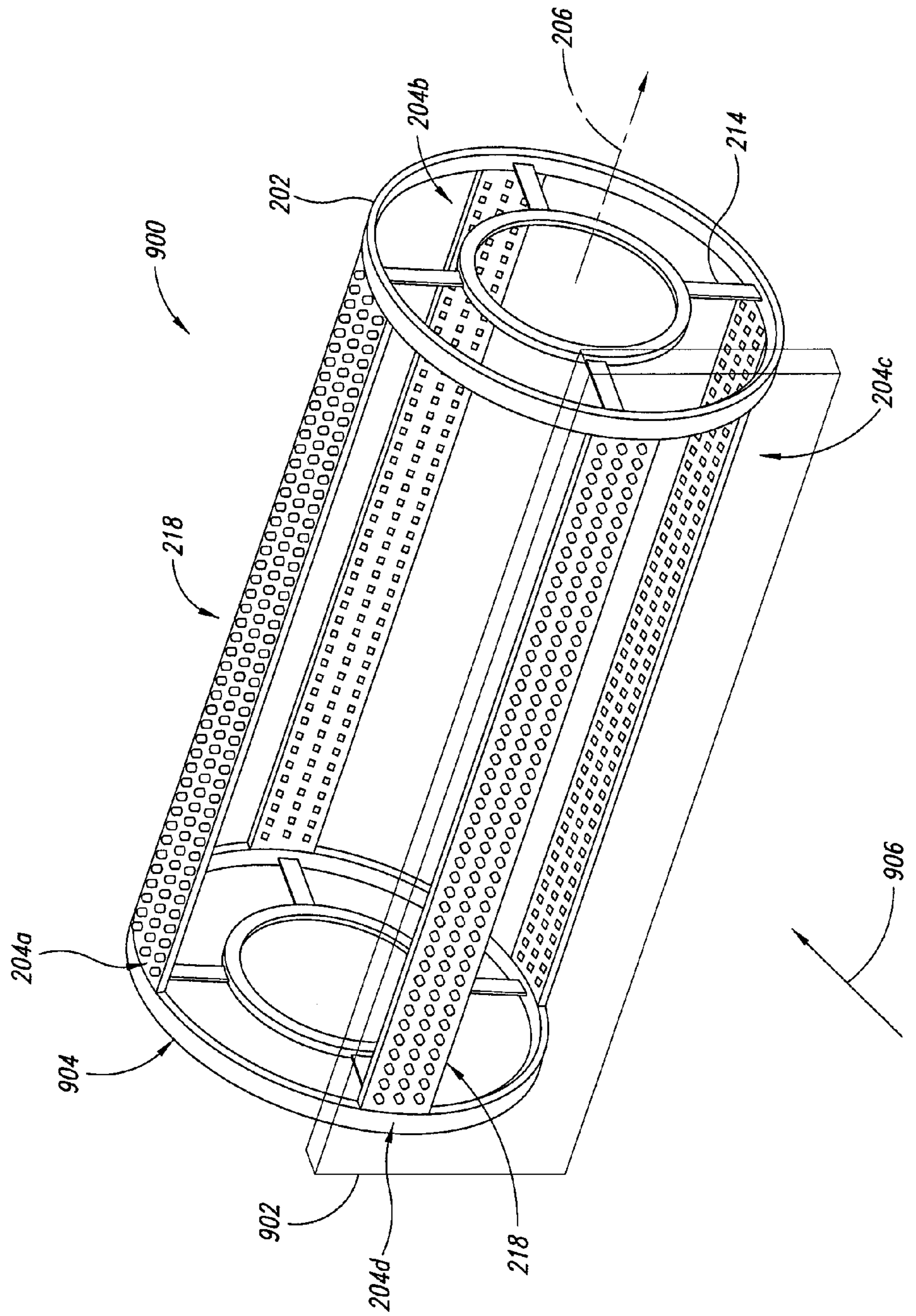
FIG. 9 is an isometric view of a display including a configurable rotatable display formed as single physical reel and at least one light transmissive configurable fixed display positioned relatively in front of the physical reel, according to another illustrated embodiment.

FIG. 9 shows a display structure 900, according to another illustrated embodiment.

The display structure 900 includes at least one configurable fixed display 902 and at least one configurable rotatable display 904. The configurable fixed display 902 may be positioned relatively in front of the configurable rotatable display 904 with respect to a point of view (illustrated by arrow 906 of a user or player. The configurable fixed display 902 does not rotate with respect to the housing or cabinet 102 (FIG. 1) and hence is denominated as fixed.

The configurable rotatable display 904 may be substantially identical or similar to the configurable rotatable display 200, hence the same reference numbers are used to identify specific elements thereof. The configurable fixed display 902 is light transmissive such that light produced by the light sources 218 of the configurable rotatable display 904 is visible through the configurable fixed display 902. The configurable fixed display 902 is configurable in the sense that an output produced by the configurable fixed display 902 may be controlled and varied, for example in contrast to the fixed indicia 806 (FIG. 8). The configurable fixed display 902 may take a variety of forms. For example, the configurable fixed display 902 may take the form of one or more transmissive LCD arrays.

Figure 10:
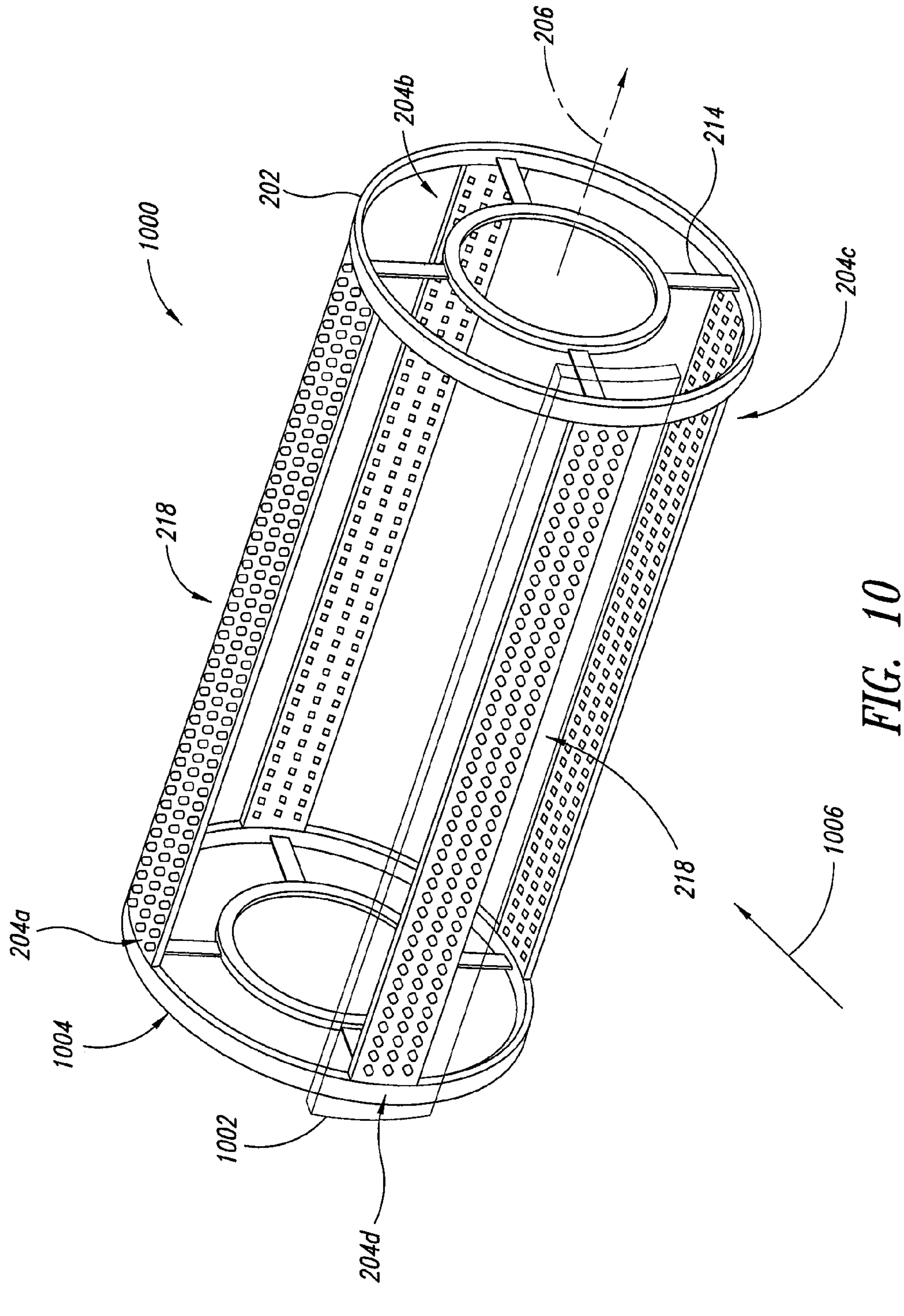
FIG. 10 is an isometric view of a display including a configurable rotatable display formed as a single physical reel and at least one transparent curved configurable fixed display positioned relatively in front of the physical reel, according to another illustrated embodiment.

FIG. 10 shows a display structure 1000, according to another illustrated embodiment.

The display structure 900 includes at least one configurable fixed curved display 1002 and at least one configurable rotatable display 1004. The configurable fixed curved display 1002 may be positioned relatively in front of the configurable rotatable display 1004 with respect to a point of view (illustrated by arrow 1006 of a user or player. The configurable fixed curved display 1002 does not rotate with respect to the housing or cabinet 102 (FIG. 1), hence is denominated as fixed.

The configurable rotatable display 1004 may be substantially identical or similar to the configurable rotatable display 200, hence the same reference numbers are used to identify specific elements thereof. The configurable fixed curved display 1002 may be transparent to at least some wavelengths of light that are in the visible portion of the electromagnetic spectrum, such that light produced by the light sources 218 of the configurable rotatable display 1004 is visible through the configurable fixed curved display 1002. The configurable fixed curved display 1002 is configurable in the sense that an output produced by the configurable fixed curved display 1002 may be controlled and varied, for example in contrast to the fixed indicia 806 (FIG. 8). The configurable fixed curved display 1002 may have an arcuate cross-section and the curve of the configurable fixed curved display 1002 may be about the axis of rotation 206 of the configurable rotatable display 1004. This may enhance the simulation of conventional reels. The configurable fixed curved display 1002 may take a variety of forms. For example, the configurable fixed curved display 1002 may take the form of one or more transparent curved organic-LCD (i.e., OLED) arrays.

Figure 11:
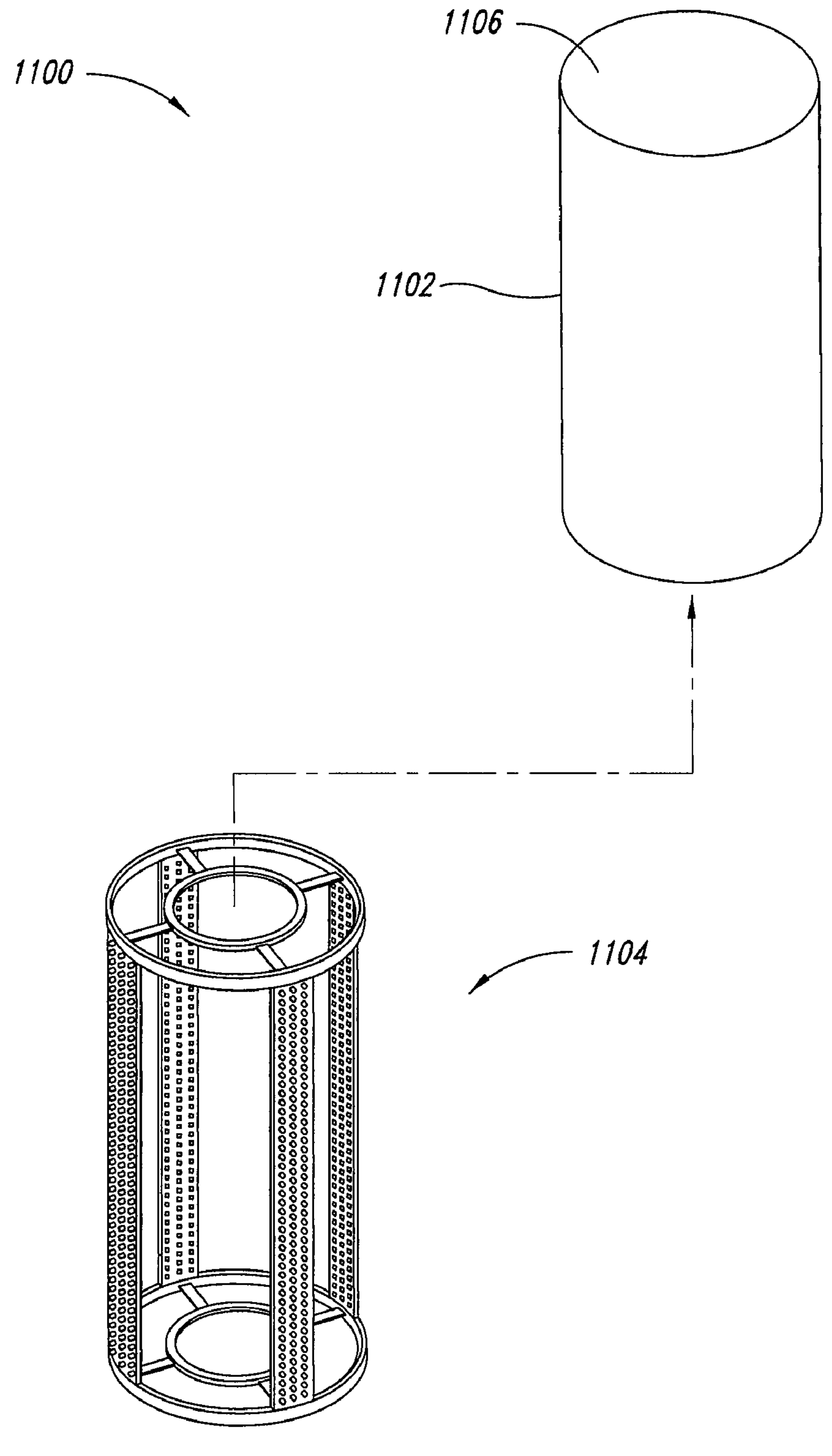
FIG. 11 is a partially exploded isometric view of a display in the form of a pole which can form part of a top box, according to another illustrated embodiment.

FIG. 11 shows a pole 1100 used as part of a top box of a gaming machine, according to one illustrated embodiment.

The pole includes a cover 1102 and a configurable rotatable display 1004.

The cover 1102 is generally tubular, having an interior sized to receive a perimeter or diameter of the configurable rotatable display 1004. The cover 1102 may be cylindrical or may have some other cross-sectional shape. The cover 1102 may be closed at a top 1006 thereof. At least some portions of the cover 1102 are translucent (i.e., at least partially light transmissive), and may even be transparent. The cover 1102 may include sections along a longitudinal axis (not shown) of the pole 1100, which may be of different colors. Alternatively, the sections may be of a single color. In some embodiments, such as the illustrated embodiment, the cover 1102 may not have separate physical sections, but rather may rely on the configurable rotatable display 1004 to produce the appearance of separate sections when such a visual effect is desirable. Such may advantageously allow simple and inexpensive reconfiguration without the need to physically replace the pole 1100.

The configurable rotatable display 1004 may be substantially identical or similar to the configurable rotatable display 200, hence the same reference numbers are used to identify specific elements thereof. Portions along the axis of rotation may be selectively illuminated to produce the appearance of separate sections.

The various embodiments may employ other display technologies. For example, dot matrix, OLED. Electro-luminescent, electronic paper or e-paper. For instance one or more of these display technologies may be used to implement a display within the configurable rotatable displays described above. Additionally or alternatively, one or more of these display technologies may be used to implement a display in another such position, for example, in front of such configurable rotatable displays.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other machines, not necessarily the exemplary gaming machine generally described above.

For instance, although not required, some portion of the embodiments may be implemented in the general context of computer-executable instructions or logic, such as program application modules, objects, or macros, executed by a computer. Those skilled in the relevant art will appreciate that the illustrated embodiments as well as other embodiments can be practiced with other computer system configurations, including handheld devices, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

Also for instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus, comprising:

at least a first support structure mounted to rotate about a first axis of rotation;

a first set of display structures including at least two display structures each including a plurality of addressable elements, each of the at least two display structures of the first set of display structures being elongated with a respective longitudinal axis, each of the at least two display structures of the first set of display structures physically coupled to the first support structure to rotate therewith about the first axis;

a mechanical wheel that is positioned relatively behind the first set of display structures and that is visible from relatively in front of the first set of display structures as the first set of display structures rotates;

a drive mechanism coupled to drivingly rotate the first support structure about the first axis of rotation along with the at least two display structures mounted thereto at a speed sufficiently fast that individual ones of the at least two display structures are not visually discernable during operation of the apparatus;

a controller communicatively coupled to control the addressable elements of the at least two display structures of the first set to selectively emit light from the at least two display structures of the first set;

a housing having an interior in which the first support structure is received and at least one window that provides visual access from an exterior of the housing to a portion of the interior; and a light transmissive display structure positioned between the first set of display structures and the window through which the light transmissive display structure and the first set of display structures is viewable by a user of the apparatus, wherein the light transmissive display structure passes at least some visually discernable amount of light emitted by the first set of display structures.

2. The apparatus of claim 1 wherein the at least two display structures of the first set of display structures are physically coupled to the first support structure with the respective longitudinal axes of the display structures of the first set of display structures parallel to the first axis and with each of the at least two display structures of the first set of display structures angularly spaced about the first axis of rotation with respect to each other to form a first configurable reel therewith.

3. The apparatus of claim 1, further comprising:

at least a second support structure mounted to rotate about the first axis of rotation and spaced along the first axis of rotation from the first support structure; and a second set of display structures including at least two display structures each including a plurality of addressable elements, each of the at least two display structures of the second set of display structures being elongated with a respective longitudinal axis, each of the at least two display structures of the second set of display structures physically coupled to the second support structure to rotate therewith about the first axis, wherein the controller is communicatively coupled to control the addressable elements of the at least two display structures of the second set of display structures to selectively emit light from the at least two display structures of the second set of display structures.

4. The apparatus of claim 1, further comprising:

a plurality of additional support structures mounted to rotate about the first axis of rotation and spaced along the first axis of rotation from the first support structure and from one another;

a plurality of additional sets of display structures each including at least two display structures each of which include a plurality of addressable elements, wherein each of the additional support structures has at least one of the additional sets of display structures physically coupled thereto to rotate therewith about the first axis of rotation as a respective additional configurable reel, wherein a total number of support structures including the first support structure and all of the additional support structures is an odd number.

5. The apparatus of claim 1, further comprising:

at least a second support structure mounted to rotate about a second axis of rotation, the second support structure received within a perimeter defined by a rotation of the at least two display structures of the first set of display structures; and a second set of display structures including at least two display structures each including a plurality of addressable elements, each of the at least two display structures of the second set of display structures being elongated with a respective longitudinal axis, each of the at least two display structures of the second set of display structures physically coupled to the second support structure to rotate therewith about the second axis, wherein the controller is communicatively coupled to control the addressable elements of the at least two display structures of the second set of display structures to selectively emit light from the at least two display structures of the second set of display structures.

6. The apparatus of claim 1, further comprising:

a second set of display structures including at least two display structures each including a plurality of addressable elements, each of the at least two display structures of the second set of display structures being elongated with a respective longitudinal axis, each of the at least two display structures of the second set of display structures physically coupled to a second support structure inwardly from the display structures of the first set of display structures to rotate therewith about the first axis, wherein the controller is communicatively coupled to control the addressable elements of the at least two display structures of the second set of display structures to selectively emit light from the at least two display structures of the second set of display structures.

7. The apparatus of claim 1, further comprising:

a plurality of mechanical reels each bearing a number of fixed indicia, the mechanical reels mounted to rotate about a second axis of rotation, the mechanical reels received within a perimeter defined by a rotation of first set of display structures.

8. The apparatus of claim 1 wherein the first set of display structures mounted to the first support structure comprises at least two display structures, each of the at least two display structures being elongated with a respective longitudinal axis that is perpendicular to the first axis of rotation, and each of the at least two display structures mounted spaced about the first axis of rotation with respect to each other.

9. The apparatus of claim 1 wherein the light transmissive display structure is stationary with respect to the housing of the apparatus.

10. The apparatus of claim 1, further comprising:

a housing having an interior in which the first support structure is received and at least one window that provides visual access from an exterior of the housing to a portion of the interior; and a configurable light transparent curved display structure positioned between the first set of display structures and the window through which the configurable light transparent curved display structure and the first set of display structures is viewable by a user of the apparatus, wherein the configurable light transparent curved display structure passes at least some visually discernable amount of light emitted by the first set of display structures, wherein the configurable light transparent curved display structure is configurable by the controller.

11. The apparatus of claim 1, further comprising:

a housing, a top box carried above the housing, wherein the first support structure and the first set of display structures are located in the top box.

12. The apparatus of claim 1 wherein the addressable elements of the first display structure are a number of light emitting diodes.

13. The apparatus of claim 1 wherein the controller is configured to control the addressable elements of the at least two display structures of the first set of display structures such that addressable elements at a same relative pixel on the at least two display structures emit light at a same relative angular position along a path of rotation followed by the at least two display structures.

14. The apparatus of claim 2, further comprising:

a concealment structure located within a perimeter defined by a rotation of the at least two one display structures wherein the concealment structure is black or mirrored, wherein the concealment structure is mounted in a non-rotatable fixed position.

15. The apparatus of claim 3 wherein the at least two display structures of the first set of display structures are physically coupled to the first support structure with the respective longitudinal axes of the display structures of the first set of display structures parallel to the first axis and with each of the at least two display structures of the first set of display structures angularly spaced about the first axis of rotation with respect to each other to form a first configurable reel therewith and wherein the at least two display structures of the second set of display structures are physically coupled to the second support structure with the respective longitudinal axes of the display structures of the second set of display structures parallel to the first axis and with each of the at least two display structures of the second set of display structures angularly spaced about the first axis of rotation with respect to each other to form a second configurable reel therewith.

16. The apparatus of claim 5 wherein the second axis of rotation is co-linear with the first axis of rotation and the second set of display structures are concentrically received within a perimeter defined by the rotation of the first set of display structures.

17. The apparatus of claim 7 wherein the second axis of rotation is co-linear with the first axis of rotation.

18. The apparatus of claim 8, further comprising:

a display that is positioned relatively behind the first set of display structures and that is visible from relatively in front of the first set of display structures as the at least one display structure rotates.

* * * * *